US012768451B2

(12) United States Patent
Kamiya et al.

(10) Patent No.: US 12,768,451 B2
(45) Date of Patent: Oct. 20, 2026

(54) ELECTRICALLY CONDUCTIVE SEALING DEVICE

(71) Applicant: NOK CORPORATION, Tokyo (JP)

(72) Inventors: Yusuke Kamiya, Fukushima (JP); Hideaki Nagahamaya, Fukushima (JP); Yuki Sato, Fukushima (JP); Shota Ohashi, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 19/123,293

(22) PCT Filed: Jul. 26, 2023

(86) PCT No.: PCT/JP2023/027324
§ 371 (c)(1),
(2) Date: Apr. 22, 2025

(87) PCT Pub. No.: WO2024/089960
PCT Pub. Date: May 2, 2024

(65) Prior Publication Data

US 2026/0029053 A1 Jan. 29, 2026

(30) Foreign Application Priority Data

Oct. 27, 2022 (JP) ................................ 2022-172789

(51) Int. Cl.
*F16J 15/34* (2006.01)

(52) U.S. Cl.
CPC ....... *F16J 15/3496* (2013.01); *F16J 15/3404* (2013.01)

(58) Field of Classification Search
CPC ........................... F16J 15/3496; F16J 15/3404
See application file for complete search history.

(56) References Cited

U.S. PATENT DOCUMENTS 4,550,920 A * 11/1985 Matsushima ........ F16J 15/3232 277/576
5,852,093 A * 12/1998 Aimura ................ F16J 15/3208 524/433

(Continued)

FOREIGN PATENT DOCUMENTS

CN 206582329 U * 10/2017
CN 207554678 U * 6/2018

(Continued)

*Primary Examiner* — Vishal A Patel
(74) *Attorney, Agent, or Firm* — GREENBLUM & BERNSTEIN, P.L.C.

(57) ABSTRACT

A sealing device capable of maintaining an electrically conductive performance relative to even an inner peripheral member rotating at a high speed. The sealing device includes an electrically conductive elastic body unit that is an annular member and that includes a portion made of an elastic material with electrical conductivity. The electrically conductive elastic body unit is able to come into contact with a shaft of an electric motor and a housing. The electrically conductive elastic body unit is able to form an electrically conductive circuit between the shaft of the electric motor and the housing. An impedance of the electrically conductive circuit during a rotation of the shaft of the electric motor at a circumferential velocity of 60 m/s or less is in a range from 0.01Ω to 100Ω.

3 Claims, 14 Drawing Sheets

1

(56) References Cited

U.S. PATENT DOCUMENTS

| | | | | |
|---|---|---|---|---|
| 7,837,017 | B2 * | 11/2010 | Imoto | F16F 9/36 277/560 |
| 8,485,533 | B2 * | 7/2013 | Park | F16J 15/3284 277/551 |
| 2003/0019692 | A1 * | 1/2003 | Downes | F16J 15/3252 184/105.3 |
| 2004/0124587 | A1 * | 7/2004 | Yamamoto | F16J 15/324 277/549 |
| 2006/0071430 | A1 * | 4/2006 | Downes | F16J 15/3252 277/549 |
| 2006/0103075 | A1 * | 5/2006 | Zahn | B62K 25/08 277/436 |
| 2011/0018209 | A1 * | 1/2011 | Dahlhaus-Preussler | D06F 37/00 277/562 |
| 2016/0010750 | A1 * | 1/2016 | Colineau | F16J 15/3232 277/575 |
| 2018/0313449 | A1 * | 11/2018 | Dahlhaus-Preussler | F16J 15/322 |
| 2019/0277404 | A1 * | 9/2019 | Colineau | F16J 15/3284 |
| 2022/0099187 | A1 * | 3/2022 | Sitko | F16J 15/3256 |

FOREIGN PATENT DOCUMENTS

| | | | | |
|---|---|---|---|---|
| JP | 2000-244180 | | 9/2000 | |
| JP | 2003035371 | A * | 2/2003 | |
| WO | WO-2019131899 | A1 * | 7/2019 | F16J 15/3252 |

* cited by examiner

ELECTRICALLY CONDUCTIVE SEALING DEVICE

CROSS REFERENCE TO RELATED APPLICATIONS

This is a U.S. National Phase entry of International Patent Application No. PCT/JP2023/027324, filed on Jul. 26, 2023, which claims the benefit of Japanese Patent Application No. 2022-172789, filed on Oct. 27, 2022. The contents of these applications are incorporated herein by reference in their entirety.

BACKGROUND

Technical Field

The present disclosure relates to an electrically conductive sealing device.

Related Art

There are cases where, for example, a vehicle equipped with an electric motor, such as an electric vehicle (EV: Electric Vehicle), suffers the generation of electromagnetic noise due to an induced current generated by the motor, or the like. Such electromagnetic noise leads to a communication failure of an AM radio or another wireless communication equipment in some cases. Such electromagnetic noise also results in electrolytic corrosion of a metal part such as a bearing in some cases. Accordingly, efforts have been made to eliminate such electromagnetic noise. For example, a technology has been disclosed in which an oil seal sealing a rotary shaft of a motor is an oil seal made of an electrically conductive rubber, allowing for the release of electromagnetic noise from the rotary shaft into a housing (see, for example, Japanese Patent Application Publication No. 2000-244180).

For measures against a problem due to electromagnetic noise, such a conventional oil seal including an electrically conductive rubber has been demanded to have a configuration enabling the maintenance of an electrically conductive performance relative to even a rotary shaft rotating at a higher speed.

An object of the present disclosure is to provide a sealing device capable of maintaining an electrically conductive performance relative to even an inner peripheral member rotating at a high speed.

SUMMARY

In order to solve the above-described problem, a sealing device according to the present disclosure is a sealing device for sealing an annular space between an inner peripheral member and an outer peripheral member configured to perform a relative rotation with respect to each other, the sealing device including an electrically conductive elastic body unit that is an annular member around an axis, the electrically conductive elastic body unit including a portion made of an elastic material with electrical conductivity, in which the electrically conductive elastic body unit is able to come into contact with the inner peripheral member and the outer peripheral member and form an electrically conductive circuit between the inner peripheral member and the outer peripheral member, and an impedance of the electrically conductive circuit during the relative rotation at a circumferential velocity of 60 m/s or less is in a range from 0.01Ω to 100Ω.

In the sealing device according to an aspect of the present disclosure, the electrically conductive circuit is configured to tend to maintain an electrical contact with the inner peripheral member even though receiving a force to cancel a contact between the electrically conductive elastic body unit and the inner peripheral member based on the relative rotation.

In the sealing device according to an aspect of the present disclosure, the electrically conductive elastic body unit has a heat resistance in a range from minus 40 degrees to 200 degrees.

The sealing device according to an aspect of the present disclosure, the electrically conductive elastic body unit includes an annular electrical continuity lip around the axis, the electrical continuity lip is formed to be able to come into contact with the inner peripheral member, and the sealing device further comprises a lubricant with electrically conductive, the lubricant is interposed between the electrical continuity lip and the inner peripheral member.

In the sealing device according to an aspect of the present disclosure, the electrical continuity lip has at least one groove for retaining the lubricant, and the groove is an annular groove around the axis, the groove being formed at a portion of the electrical continuity lip, the portion being configured to come into contact with the inner peripheral member.

The sealing device according to an aspect of the present disclosure further includes a sealing device body unit for sealing the annular space, the sealing device body unit is an annular member around the axis, in which the electrically conductive elastic body unit is attachable to the sealing device body unit.

In the sealing device according to an aspect of the present disclosure, the electrically conductive elastic body unit includes an annular reinforcing ring and a main body portion, the main body portion is made of the elastic material with electrical conductivity attached to the reinforcing ring, the main body portion includes an annular electrical continuity lip around the axis, the electrical continuity lip is formed to be able to come into contact with the inner peripheral member, and the electrical continuity lip is provided on an inner peripheral side within a portion on the inner peripheral side of the reinforcing ring.

Advantageous Effects of the Disclosure

A sealing device according to the present disclosure is capable of maintaining an electrically conductive performance relative to even an inner peripheral member rotating at a high speed.

BRIEF DESCRIPTION OF THE DRAWINGS

FIGS. 4(A) and 4(B) are cross sectional views of the electrical continuity lip, in which FIG. 4(A) is a cross sectional view along a line A-A in FIG. 3 and FIG. 4(B) is a cross sectional view along a line B-B in FIG. 3.

DETAILED DESCRIPTION

Description will be made below on embodiments of the present disclosure with reference to the drawings.

Figure 1:
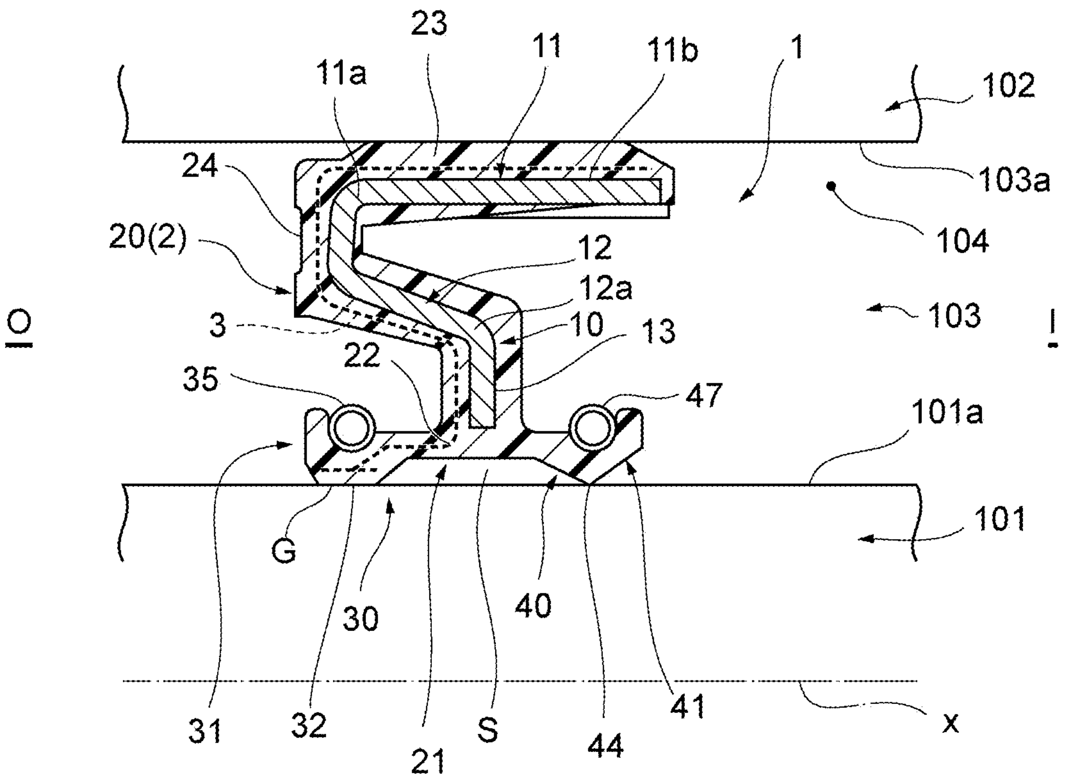
FIG. 1 is a partial cross sectional view of a sealing device according to a first embodiment of the present disclosure disposed in an annular space between an inner peripheral member and an outer peripheral member configured to perform a relative rotation with respect to each other.
Figure 2:
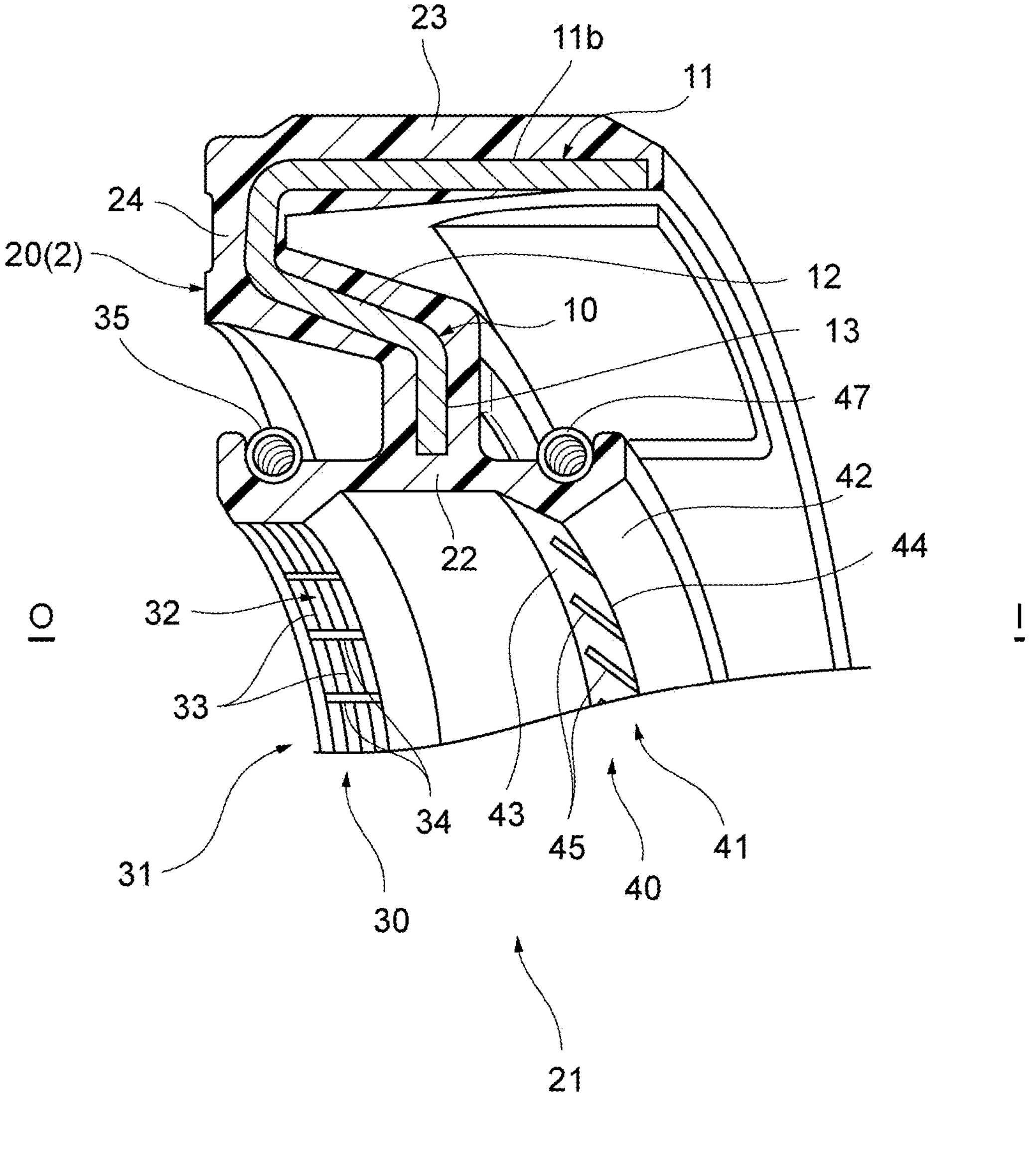
FIG. 2 is a partial perspective view of the sealing device illustrated in FIG. 1.

FIG. 1 is a partial cross sectional view of a sealing device 1 according to a first embodiment of the present disclosure disposed in an annular space between an inner peripheral member and an outer peripheral member configured to perform a relative rotation with respect to each other and FIG. 2 is a partial perspective view of the sealing device 1 illustrated in FIG. 1. It should be noted that FIG. 1 illustrates, within a cross section along an axis x of the sealing device 1 (hereinafter, also simply referred to as cross section), one side of the cross section relative to the axis x and FIG. 2 illustrates a part of the sealing device 1 in a state of being cut along a plane along the axis x. The sealing device 1 according to the present embodiment is designed for sealing an annular space between an inner peripheral member and an outer peripheral member configured to perform a relative rotation with respect to each other in an electric vehicle (EV) or the like, such as a battery electric vehicle (BEV), a hybrid vehicle (HV), or a fuel cell vehicle. The inner peripheral member and the outer peripheral member are, for example, members of a drive device equipped with an electric motor, the inner peripheral member is, for example, a rotary shaft of the electric motor, and the outer peripheral member is, for example, a housing of the drive device in which the rotary shaft of the electric motor is inserted. In the present embodiment, the sealing device 1 is designed for sealing an annular space 104 between a shaft 101, which is a rotary shaft of an electric motor (not illustrated) of a drive device (not illustrated), and a housing 102 of the drive device as illustrated in FIG. 1. It should be noted that an installation object for the sealing device 1 is not limited to such a drive device.

As illustrated in FIGS. 1 and 2, the sealing device 1 includes an electrically conductive elastic body unit 2, which is an annular member around the axis x and has a portion made of an elastic material with electrical conductivity. The electrically conductive elastic body unit 2 is able to come into contact with the shaft 101 of the electric motor and the housing 102. The electrically conductive elastic body unit 2 is also able to form an electrically conductive circuit 3 between the shaft 101 of the electric motor and the housing 102. An impedance of the electrically conductive circuit 3 during a rotation of the shaft 101 of the electric motor at a circumferential velocity of 60 m/s or less is in a range from 0.01Ω to 100Ω, inclusive. A specific description will be made below on a configuration of the sealing device 1.

The electrically conductive elastic body unit 2 is configured to tend to maintain an electrical contact with the shaft 101 even when receiving a force to cancel a contact between the electrically conductive elastic body unit 2 and the shaft 101 based on a rotation of the shaft 101 of the electric motor. In a case where a rotary shaft of an installation object rotates at a high speed, a conventional electrical continuity lip of a so-called radial type made of an elastic material with electrical conductivity receives, from the rotary shaft rotating at a high speed, a force working in such a manner as to cancel a contact between the electrical continuity lip and the rotary shaft. In a case where the rotary shaft rotates at a high speed such as a circumferential velocity of 30 m/s or more, it is speculated that the conventional radial-type electrical continuity lip has a decreased contact area with the rotary shaft as receiving the force to cancel the contact in some cases. Accordingly, in a case where the rotary shaft rotates at a high speed such as a circumferential velocity of 30 m/s or more, it is speculated that the conventional radial-type electrical continuity lip may be decreased in electrical conductivity between the electrical continuity lip and the rotary shaft. It should be noted that the circumferential velocity of the rotary shaft refers to a distance of a displacement of an outer peripheral surface of the rotary shaft per unit of time. In more details, the circumferential velocity of the rotary shaft is a distance of a displacement of a point in the outer peripheral surface of the rotary shaft per unit of time.

In contrast, in the sealing device 1, a lubricant such as a grease with electrical conductivity is interposed to maintain an electrical contact between the electrically conductive elastic body unit 2 and the shaft 101 even when the shaft 101 rotates at a high speed so that the impedance of the electrically conductive circuit 3 formed by the electrically conductive elastic body unit 2 falls within the range from 0.01Ω to 100Ω, inclusive, even in a case where the shaft 101 of the electric motor rotates at a circumferential velocity of 60 m/s or less. As seen from the above, the sealing device 1 is allowed to have the impedance within the range from 0.01Ω to 100Ω, inclusive, even in a case where the shaft 101 of the electric motor rotates at a high speed, so that it is possible to reduce a decrease in electrical conductivity.

As illustrated in FIGS. 1 and 2, the sealing device 1 has an annular shape around the axis x and is attached to the annular space 104 between a through hole 103 made in the housing 102 and the shaft 101 of the electric motor, which penetrates the through hole 103 to project out of the housing

102, thus sealing the space 104. The sealing device 1 thus prevents a sealed object such as a lubricant present in the housing 102 from leaking into an atmosphere side. In the illustrated example, a side indicated by a reference sign I is a sealed-object side and a side indicated by a reference sign O is the atmosphere side as illustrated in FIG. 1. Moreover, the axis x of the sealing device 1 attached to the space 104 is identical or substantially identical with an axis of the shaft 101 as illustrated in FIG. 1. In the illustrated example, the axis x of the sealing device 1 is identical with the axis of the shaft 101.

The sealing device 1 includes a reinforcing ring 10 that is a metal member annular around the axis x and a seal body 20 serving as the electrically conductive elastic body unit 2, which is a member attached to the reinforcing ring 10. As illustrated in, for example, FIGS. 1 and 2, the reinforcing ring 10 includes a tubular portion 11, which is a portion in a tubular shape extending along the axis x, a bent portion 12, which is an annular portion folded from an end portion (an end portion 11*a*) on the atmosphere side O of the tubular portion 11 toward the sealed-object side I, and a circular ring portion 13, which is a portion in a circular ring shape extending from an end portion (an end portion 12*a*) on an inner peripheral side of the bent portion 12 toward the inner peripheral side. The tubular portion 11, the bent portion 12, and the circular ring portion 13 are portions of the reinforcing ring 10 that are integrally formed from the same metal material. The reinforcing ring 10 is, for example, molded by pressing an annular metal plate. As illustrated in, for example, FIG. 1, the tubular portion 11 is a portion in or substantially in a cylindrical shape centered about or substantially centered about the axis x and is shaped in such a manner as to fix the sealing device 1 to the through hole 103 in a use state in which the sealing device 1 is attached to the through hole 103 of the housing 102. It should be noted that the material of the reinforcing ring 10 is not limited to a metal material.

The seal body 20 is made of an elastic material with electrical conductivity and the elastic material with electrical conductivity is cross-bonded to the reinforcing ring 10 to be integrally molded. The seal body 20 is, for example, a molded body obtained by insert molding with use of the reinforcing ring 10 as an insert part. The elastic material with electrical conductivity forming the seal body 20 is, for example, an electrically conductive rubber. Moreover, the elastic material with electrical conductivity forming the seal body 20 is, for example, a material with a heat resistance in a range from minus 40 degrees to 200 degrees, inclusive, and, for example, an electrically conductive fluorocarbon rubber (FKM). As illustrated in, for example, FIGS. 1 and 2, the seal body 20 is attached to the reinforcing ring 10 in such a manner as to cover the whole of the reinforcing ring 10 and includes a seal portion 21, a base portion 22, a gasket portion 23, and a cover portion 24. The seal portion 21 includes an electrical continuity lip portion 30 and a seal lip portion 40. It should be noted that the seal portion 21, the base portion 22, the gasket portion 23, and the cover portion 24 are portions of the seal body 20 that are integrally formed from the same material.

The base portion 22 is a portion located at and in the vicinity of an end portion on the inner peripheral side of the circular ring portion 13 of the reinforcing ring 10, the gasket portion 23 is a portion covering an outer peripheral surface 11*b* of the tubular portion 11 of the reinforcing ring 10, and the cover portion 24 is a portion covering the reinforcing ring 10 between the base portion 22 and the gasket portion 23. An outer diameter of the gasket portion 23 is the same as or larger than a diameter of an inner peripheral surface 103*a* of the through hole 103 of the housing 102. Thus, in a case where the sealing device 1 is attached to the space 104 of the housing 102, the gasket portion 23 is compressed in a radial direction between the tubular portion 11 of the reinforcing ring 10 and the housing 102, fixing the sealing device 1 to the housing 102 with sealing between the inner peripheral surface 103*a* of the through hole 103 of the housing 102 and the sealing device 1.

As described above, the seal portion 21, which is a portion bifurcated from the base portion 22, includes the electrical continuity lip portion 30 and the seal lip portion 40 extending opposite each other along the axis x as illustrated in FIGS. 1 and 2. The electrical continuity lip portion 30 extends from an end on the atmosphere side O of the base portion 22 toward the atmosphere side O in such a manner as to be able to come into contact with an outer peripheral surface 101*a* of the shaft 101. Moreover, the seal lip portion 40 extends from an end on the sealed-object side I of the base portion 22 toward the sealed-object side I in such a manner as to be able to come into contact with the outer peripheral surface 101*a* of the shaft 101. The electrical continuity lip portion 30 extends, for example, in parallel with or substantially in parallel with the axis x and the seal lip portion 40 extends, for example, in parallel with or substantially in parallel with the axis X.

As illustrated in FIGS. 1 and 2, the seal lip portion 40 includes a seal lip 41 at an end portion on the sealed-object side I. The seal lip 41 is a portion extending along a circular ring or a substantially circular ring centered about or substantially centered about the axis x and is in a wedge shape projecting toward the inner peripheral side in cross section. The seal lip portion 40 has a form in which the seal lip 41 is configured to come into contact with the outer peripheral surface 101*a* of the shaft 101.

Specifically, for example, the seal lip 41 has a sealed-object-side surface 42 and an atmosphere-side surface 43, which form the above-described wedge-shaped cross section, as illustrated in FIG. 2. The sealed-object-side surface 42 is an annular surface facing the inner peripheral side and the sealed-object side I and the atmosphere-side surface 43 is an annular surface facing the inner peripheral side and the atmosphere side O. The sealed-object-side surface 42 and the atmosphere-side surface 43 intersect each other on the inner peripheral side, forming, at an intersection, a distal edge 44 forming a circular ring or a substantially circular ring as illustrated in FIGS. 1 and 2.

Figure 5:
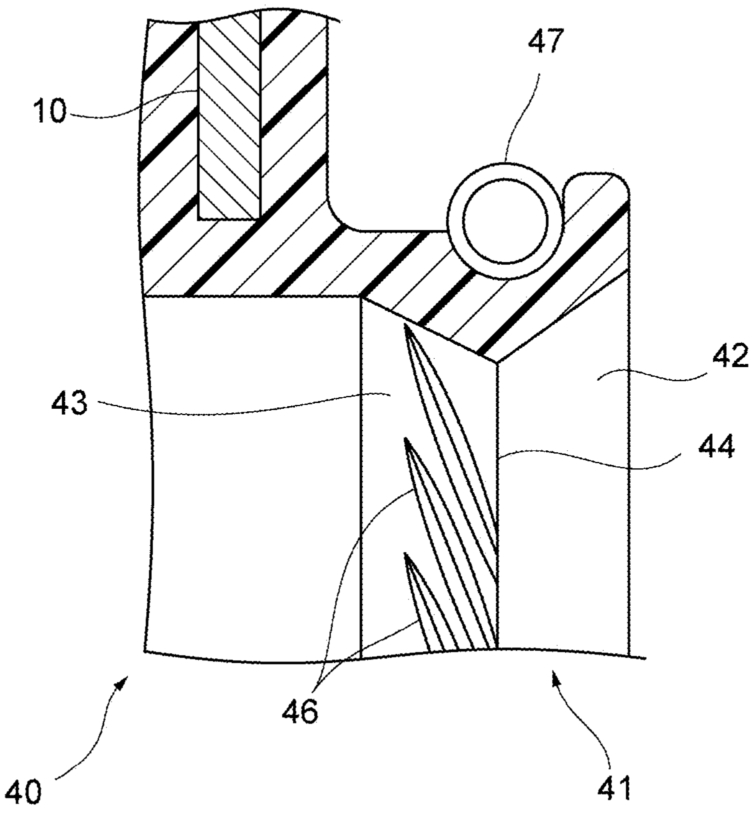
FIG. 5 is a diagram illustrating a thread protrusion that is a modification example of a thread groove of the sealing device illustrated in FIG. 1.

The atmosphere-side surface 43 is provided with a plurality of thread grooves 45 serving as a fluid returning portion. The thread grooves 45 are grooves recessed from the atmosphere-side surface 43 and also grooves, the beginnings of which are the distal edge 44, inclined in a direction of rotation of the shaft 101. The thread grooves 45 generate airflow directed from a side of the atmosphere-side surface 43 toward a side of the sealed-object-side surface 42 with a rotation of the shaft 101, producing a screw pumping action to cause a sealed object (not illustrated) oozing into the atmosphere side O over the distal edge 44 to return to the sealed-object side I. It should be noted that the atmosphere-side surface 43 may include thread protrusions 46 illustrated in FIG. 5 in place of the thread grooves 45. The thread protrusions 46 are protrusions projecting from the atmosphere-side surface 43 and also protrusions, the beginnings of which are the distal edge 44, inclined in the direction of rotation of the shaft 101.

The seal lip portion 40 is formed in a manner such that the seal lip 41 comes into contact with the outer peripheral surface 101*a* of the shaft 101 at and in the vicinity of the distal edge 44 with a predetermined interference as illustrated in FIGS. 1 and 2. The seal lip portion 40 is also provided with a garter spring 47 at a position opposite the seal lip 41. The garter spring 47 applies a tension force to press the seal lip 41 toward the inner peripheral side to the seal lip portion 40, increasing a tension force to press the seal lip 41 against the outer peripheral surface 101*a* of the shaft 101.

The electrical continuity lip 30 includes, an electrical continuity lip 31 at an end portion on the atmosphere side O as illustrated in, for example, FIGS. 1 and 2. The electrical continuity lip 31 is a portion extending along a circular ring or a substantially circular ring centered about or substantially centered about the axis x and is, for example, in a rectangular or trapezoidal shape projecting toward the inner peripheral side in cross section. The electrical continuity lip portion 30 has a form in which the electrical continuity lip 31 is configured to come into contact with the outer peripheral surface 101*a* of the shaft 101.

Specifically, for example, the electrical continuity lip 31 has an annular contact surface 32, which forms the above-described rectangular or trapezoidal cross section, as illustrated in FIGS. 1 and 2. The contact surface 32 is configured to come into surface contact with the outer peripheral surface 101*a* of the shaft 101 and, for example, a cylindrical or substantially cylindrical surface centered about or substantially centered about the axis x. The contact surface 32 is not limited to a cylindrical or substantially cylindrical surface and may be a surface in any other shape. The contact surface 32 may be, for example, an annular surface forming a curved line projecting toward the inner peripheral side in cross section. In this case, the contact surface 32 is deformed along the outer peripheral surface 101*a* of the shaft 101 in the use state, which makes it possible to increase or maintain a contact area relative to the outer peripheral surface 101*a* of the shaft 101.

Figure 3:
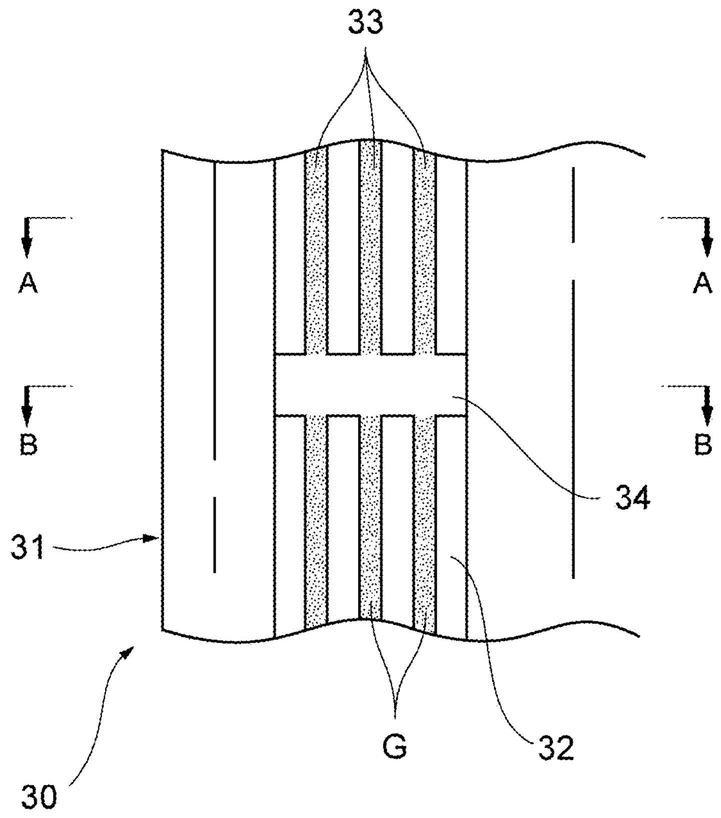
FIG. 3 is a diagram illustrating a part of a contact surface of an electrical continuity lip as viewed from an inner peripheral side.
Figure 4A:
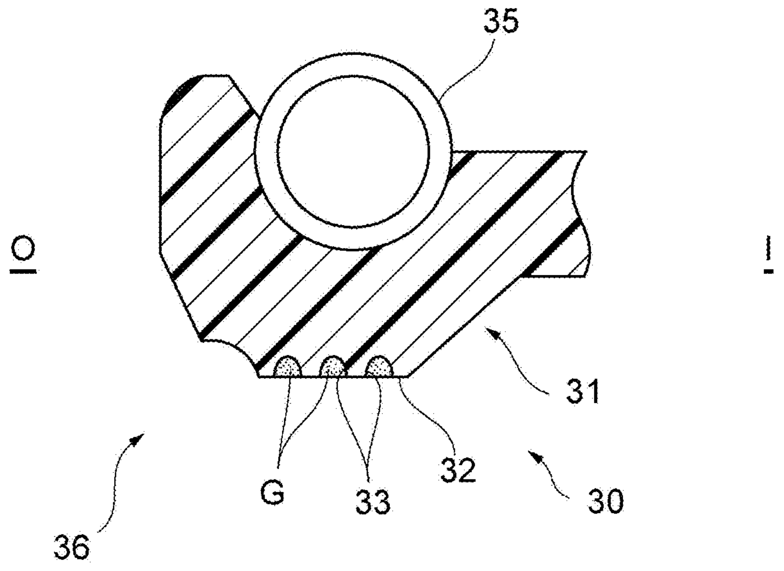
Figure 4B:
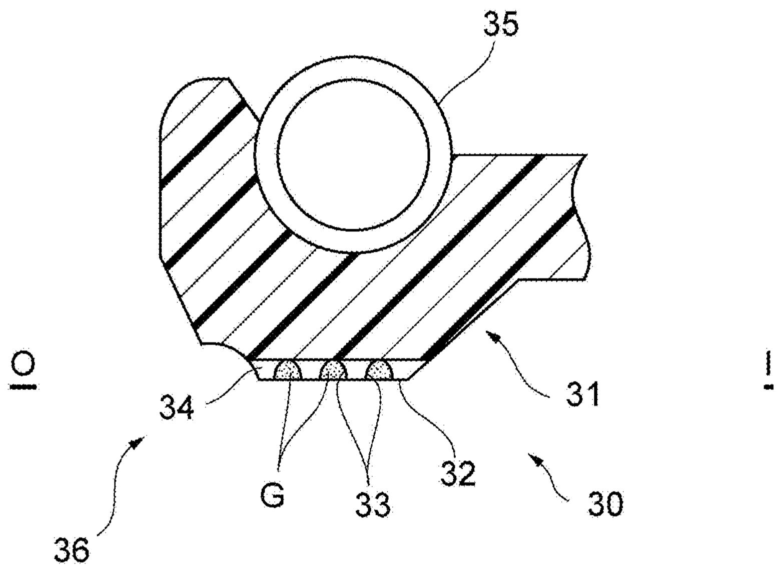

FIG. 3 is a diagram illustrating a part of the contact surface 32 of the electrical continuity lip 31 as viewed from the inner peripheral side and FIG. 4(A) is a cross sectional view along a line A-A in FIG. 3 and FIG. 4(B) is a cross sectional view along a line B-B in FIG. 3. As illustrated in FIGS. 2, 3, 4(A), and 4(B), the contact surface 32 is provided with a plurality of annular grease grooves 33 around the axis x. As illustrated in FIGS. 4(A) and (B), the grease grooves 33 are grooves recessed from the contact surface 32 toward the outer peripheral side and are also, for example, annular grooves extending along a circular ring or a substantially circular ring centered about or substantially centered about the axis x. Moreover, the grease grooves 33 are provided, for example, in a direction of the axis x at or substantially at an equal interval. Although the three grease grooves 33 are provided in the illustrated example, the number of the grease grooves 33 is not limited to three and may be one or two or four or more.

As illustrated in FIGS. 3, 4(A), and 4(B), a grease G, which is a lubricant, is contained and retained in the grease grooves 33. The grease G retained in the grease grooves 33 is a grease with electrical conductivity. A shape of the grease grooves 33 is favorably a shape suitable for retaining the grease G. For example, a depth of the grease grooves 33 is favorably a depth enabling the retention of the grease G. Moreover, a cross-sectional shape of the grease grooves 33 is, for example, a parabolic shape as illustrated in FIGS. 4(A) and (B). It should be noted that the cross-sectional shape of the grease grooves 33 is not limited to the parabolic shape and may be any other shape such as a rectangular shape or a curved shape.

The contact surface 32 of the electrical continuity lip 31 is also provided with a plurality of communicating grooves 34 as illustrated in FIGS. 2, 3, and 4(B). The communicating grooves 34 of the contact surface 32 are grooves recessed from the contact surface 32 toward the outer peripheral side and extending along the axis x across the full width in the direction of the axis x of the contact surface 32. The communicating grooves 34 intersect the grease grooves 33 to be in communication with them so that a space S (see FIG. 1) created between the shaft 101 and the electrical continuity lip portion 30 and the seal lip portion 40 is in communication with a space on the atmosphere side O. The communicating grooves 34 extend, for example, in parallel with or substantially in parallel with the axis x and are equiangularly or substantially equiangularly provided around the axis x.

For example, only the inside of the grease grooves 33 is filled with the grease G, whereas the communicating grooves 34 are filled with no grease G. The grease G thus remains in the grease grooves 33 and is unlikely to enter the communicating grooves 34. Although the grease G may be accidentally carried into the communicating grooves 34 with the rotation of the shaft 101, it is possible to prevent the grease G from getting clogged in the communicating grooves 34 by forming the communicating grooves 34 wide in a circumferential direction or deep to some extent. Accordingly, for example, a groove width or depth of the communicating grooves 34 is set at a value to prevent the grease G from getting clogged in the communicating grooves 34. It should be noted that the groove width of the communicating grooves 34 is a width of the communicating grooves 34 in the circumferential direction, which is a direction around the axis x.

As described alter, the communicating grooves 34 serve to inhibit a pressure in the space S (see FIG. 1) created between the shaft 101 and the electrical continuity lip portion 30 and the seal lip portion 40 from becoming negative. The form of the communicating grooves 34, such as the shape, size, or number of the communicating grooves 34, may be varied, insofar as the communicating grooves 34 serve to inhibit the pressure in the space S from becoming negative.

As illustrated in FIGS. 1, 2, 4(A), and 4(B), the electrical continuity lip portion 30 is provided with a garter spring 35 at a position opposite the electrical continuity lip 31. The garter spring 35 applies a tension force to press the electrical continuity lip 31 toward the inner peripheral side to the electrical continuity lip portion 30, increasing a tension force to press the electrical continuity lip portion 30 against the outer peripheral surface 101*a* of the shaft 101.

The contact surface 32 of the electrical continuity lip 31 is configured to come into surface contact with the outer peripheral surface 101*a* of the shaft 101 as described above. Thus, as the contact surface 32 comes into contact with the outer peripheral surface 101*a* of the shaft 101, a space between the contact surface 32 and the outer peripheral surface 101*a* is filled with the grease G retained in the grease grooves 33 as described later. Accordingly, it is preferable that a width in the direction of the axis x (an axial length) of the contact surface 32 of the electrical continuity lip 31 be set at a value to allow the grease G put between the contact surface 32 and the outer peripheral surface 101*a* of the shaft 101 to have an extent (an area), a filling rate, or the like that makes a later-described electrical continuity between the contact surface 32 and the shaft 101 favorable.

For example, the axial length of the contact surface 32 is set on the basis of the groove width or the number of the grease grooves 33 arranged in the direction of the axis x or the shape or the like thereof. In the illustrated example, the axial length of the contact surface 32 of the electrical continuity lip 31 is a length equal to or more than a diameter of the garter spring 35 as illustrated in FIGS. 1, 2, 4(A), and 4(B). The axial length of the contact surface 32 is the same as the diameter of the garter spring 35 or may be shorter than the diameter of the garter spring 35 as long as it is possible to provide the grease grooves 33.

It can be said that the grease G is an essential element for the sealing device 1 in use. Accordingly, for example, the grease grooves 33 retain the grease G in advance so that it is possible to fill the space between the contact surface 32 and the outer peripheral surface 101*a* of the shaft 101 with the grease G. The sealing device 1 thus includes a grease supply portion 36 that retains in advance the grease G inside the grease grooves 33 provided on the contact surface 32 and fills the space between the contact surface 32 and the outer peripheral surface 101*a* of the shaft 101 with the grease G.

The seal body 20 of the sealing device 1, which is an integral structure molded from an electrically conductive rubber, covers the reinforcing ring 10. Moreover, the grease G is interposed in the form of film between the contact surface 32 of the electrical continuity lip 31 and the outer peripheral surface 101*a* of the shaft 101 and the grease G has electrical conductivity. The sealing device 1 thus includes the electrically conductive circuit 3 (see FIG. 1) penetrating through the seal body 20, which includes the grease G and the reinforcing ring 10, leading from the electrical continuity lip 31 and the seal lip 41, which are in contact with the shaft 101 via the grease G, to the housing 102 through the gasket portion 23. In other words, the electrically conductive circuit 3 with electrical conductivity formed by the electrically conductive elastic body unit 2 (the seal body 20) of the sealing device 1 is provided by the grease G and the seal body 20 and, additionally, the grease G, the reinforcing ring 10, and the seal body 20.

Next, description will be made on the workings of the sealing device 1 having the above-described configuration. In the sealing device 1 in the use state, which is attached between the through hole 103 of the housing 102 and the shaft 101 of the drive device, the electrical continuity lip 31 and the seal lip 41 are in contact with the outer peripheral surface 101*a* of the shaft 101, sealing the sealed object within the sealed-object side I to prevent the leakage of the sealed object from the sealed-object side I. For the sealing, the seal lip 41 fulfills a main sealing function to prevent the leakage of the sealed object from the sealed-object side I. The electrical continuity lip 31 fulfills an auxiliary sealing function to block, if the sealed object leaks through the seal lip 41, the sealed object by sealing the space between the contact surface 32 and the outer peripheral surface 101*a* of the shaft 101. The electrical continuity lip 31 also functions as a dust lip to reduce the entry of foreign substances such as rainwater, mud, and dust from the atmosphere side O into the sealed-object side I.

There are cases where a vehicle equipped with an electric motor, such as an electric vehicle (EV), undergoes the generation electromagnetic noise due to an induced current generated by the motor, or the like. There are also cases where electromagnetic noise is generated by an on/off operation of an inverter for the control of an electric current to be supplied to motorized equipment such as an electric motor or an induced voltage or the like of the motorized equipment itself. The electromagnetic noise is, for example, transmitted to the shaft 101 and radiated through an antenna, which is the shaft 101. There are cases where such radiated electromagnetic noise leads to a communication failure of an in-vehicle radio set or in-vehicle wireless equipment and also causes a variety of electronic equipment to malfunction. There are also cases where such electromagnetic noise leads to the occurrence of electrolytic corrosion of a metal part.

In the sealing device 1, the seal body 20 produced by molding an electrically conductive rubber forms the electrically conductive circuit 3, through which electromagnetic noise transmitted to the shaft 101 flows to the housing 102. This makes it possible to prevent the occurrence of a communication failure or a malfunction of electronic equipment and the occurrence of electrolytic corrosion of a metal part.

As described above, the space between the contact surface 32 of the electrical continuity lip 31 and the shaft 101 is filled with the grease G, so that a coating film of the grease G is interposed between the contact surface 32 and the shaft 101 and the coating film of the grease G forms a part of the electrically conductive circuit 3. This makes it possible to reduce or eliminate a gap between the contact surface 32 of the electrical continuity lip 31 and the shaft 101, enabling an enhancement of electrical conductivity between the contact surface 32 of the electrical continuity lip 31 and the shaft 101. The electrically conductive circuit 3 thus makes it possible to increase a flow rate of the electromagnetic noise transmitted to the shaft 101 to the housing 102, enabling a further reduction in the occurrence of failures based on the electromagnetic noise.

Moreover, in a case where the shaft 101 rotates at a high speed, the electrical continuity lip portion 30 receives a force to cancel the contact between the electrical continuity lip 31 and the shaft 101 based on the rotation of the shaft 101. Thus, in a case where the shaft 101 rotates at a high speed, for example, in a case where the shaft 101 rotates at a high speed equal to or more than a circumferential velocity of 30 m/s, the contact surface 32 of the electrical continuity lip 31 is separated from the outer peripheral surface 101*a* of the shaft 101 with a gap created therebetween in some cases. In view of the above, in the sealing device 1, the space between the contact surface 32 of the electrical continuity lip 31 and the outer peripheral surface 101*a* of the shaft 101 is filled with the grease G, so that the coating film of the grease G is interposed between the contact surface 32 and the outer peripheral surface 101*a* of the shaft 101. Thus, even though a gap breaking the conduction of electricity is created between the contact surface 32 of the electrical continuity lip 31 and the outer peripheral surface 101*a* of the shaft 101 during a high-speed rotation of the shaft 101, the gap is filled with the grease G. An electrically conductive performance between the contact surface 32 of the electrical continuity lip 31 and the shaft 101 is thus maintained even during a high-speed rotation of the shaft 101, enabling the maintenance of the flow rate of the electromagnetic noise transmitted to the shaft 101 to the housing 102.

Figure 6:
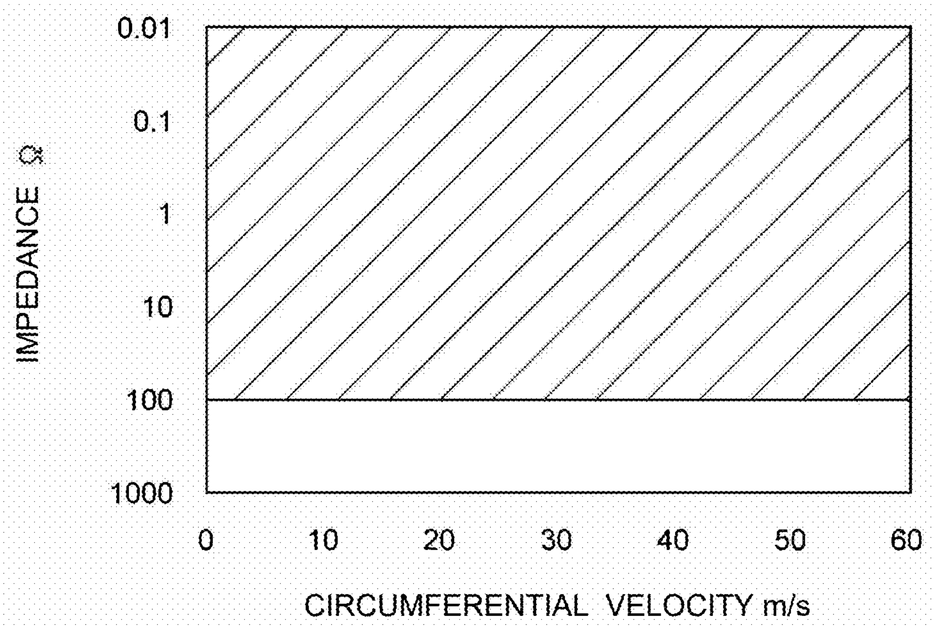
FIG. 6 is a diagram illustrating a graph showing an electrically conductive performance relative to a circumferential velocity of a rotary shaft of the sealing device according to an embodiment of the present disclosure.

Accordingly, in the sealing device 1, the impedance of the electrically conductive circuit 3 in the range from 0.01Ω to 100Ω, inclusive, is possible during a rotation of the shaft 101 of the electric motor at a circumferential velocity of 60 m/s or less as illustrated in FIG. 6. Thus, since the impedance of the electrically conductive circuit 3 is allowed to fall within the range from 0.01Ω to 100Ω, inclusive, even in a case where the shaft 101 of the electric motor rotates at a high speed, it is possible to reduce a decrease in electrical conductivity in the sealing device 1.

Figure 7:
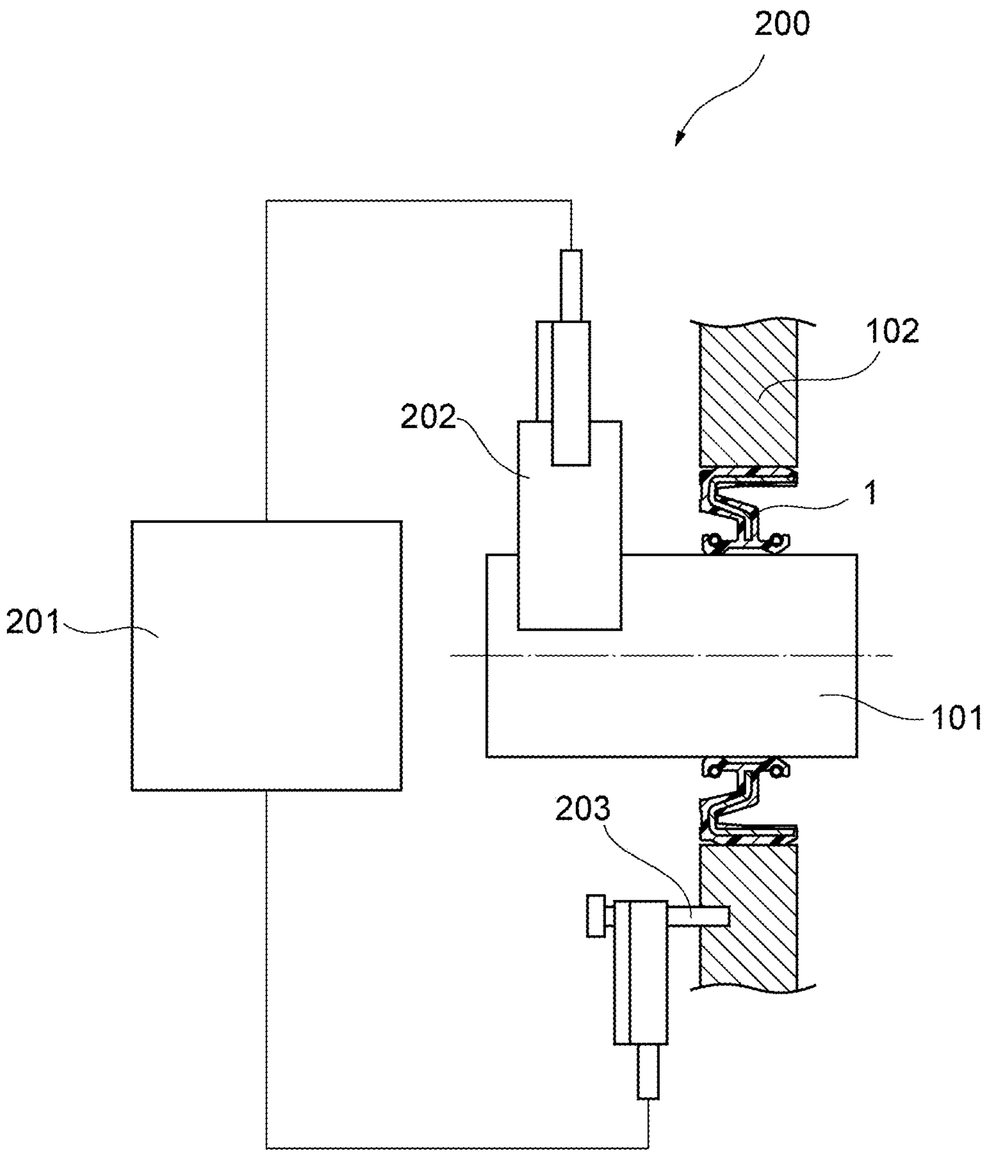
FIG. 7 is a diagram illustrating an example of an impedance measurement device for measuring an impedance of an electrically conductive circuit of the sealing device.

The impedance of the electrically conductive circuit 3 of the sealing device 1 is measurable by, for example, an impedance measurement device 200 as illustrated in FIG. 7. The impedance measurement device 200 includes an impedance analyzer 201. In the impedance measurement device 200, one terminal of the impedance analyzer 201 is in contact with the shaft 101 through an electrically conductive member 202 with electrical conductivity, which is, for example, a copper plate or the like, whereas the other terminal of the impedance analyzer 201 is fixed to the housing 102 through an electrically conductive member 203 with electrical conductivity. The shaft 101 is slidable with respect to the electrically conductive member 202. It should be noted that for the impedance measurement device 200, a member shaped to look like the shaft 101 in place of the shaft 101 may be used and, likewise, a member shaped to look like the housing 102 may be used in place of the housing 102.

The measurement of the impedance of the electrically conductive circuit 3 of the sealing device 1 using the impedance measurement device 200 is to be performed by causing the shaft 101 to rotate at a rotation speed within a range of 0 to 60 m/s in terms of circumferential velocity and detecting an impedance of the electrically conductive circuit 3 at that rotation speed using the impedance analyzer 201. The impedance of the electrically conductive circuit 3 at the rotation speed of the shaft 101 in a range from 0 to 60 m/s in terms of circumferential velocity is obtainable in this manner. As described above, a measurement value of the impedance of the electrically conductive circuit 3 at the rotation speed of the shaft 101 in a range from 0 to 60 m/s in terms of circumferential velocity is in the range of 0.01Ω to 100Ω as illustrated in FIG. 6.

As for conditions for the measurement of the impedance of the electrically conductive circuit 3 by the impedance measurement device 200, for example, a measurement frequency of the impedance analyzer 201 is 500 kHz and a voltage amplitude is 5 V.

Moreover, the distal edge 44 of the seal lip 41 and the vicinity thereof are lubricated with the salad object such as a lubricant present on the sealed-object side I. In contrast, the contact surface 32 of the electrical continuity lip 31 is not expected to be lubricated with the sealed object on the sealed-object side I. Accordingly, the electrical continuity lip 31 of the sealing device 1 is provided with the grease grooves 33 on the contact surface 32 to retain the grease G so that the space between the contact surface 32 and the shaft 101 is filled with the grease G in the grease grooves 33 during a rotation of the shaft 101. The contact surface 32 is thus lubricated with the grease G, enabling the protection of the contact surface 32 and the shaft 101 from wear and damage.

Moreover, during the rotation of the shaft 101, the thread grooves 45 or the thread protrusions 46 provided on the seal lip 41 cause the sealed object oozing from the sealed-object side I into the atmosphere side O over the distal edge 44 to return to the sealed-object side I by the screw pumping action. Meanwhile, the screw pumping action tends to make the pressure in the space S between the shaft 101 and the electrical continuity lip portion 30 and the seal lip portion 40 negative. Supposing that the pressure in the space S becomes negative, the electrical continuity lip 31 and the seal lip 41 are more forcefully pressed against the shaft 101. At this time, unlike in the electrical continuity lip 31, there are cases where abnormal friction occurs, in particular, at and in the vicinity of the distal edge 44 of the seal lip 41, where no coating film of the grease G is formed between the seal lip 41 and the shaft 101.

In the sealing device 1, when the screw pumping action is produced by the thread grooves 45 or the thread protrusions 46, air on the atmosphere side O is introduced into the space S through the communicating grooves 34 provided on the contact surface 32 of the electrical continuity lip 31. This keeps the pressure in the space S from becoming negative or keeps the negative pressure in the space S from being increased, which makes it possible to prevent abnormal friction of the seal lip 41 caused in a case where the pressure in the space S becomes negative.

Figure 8:
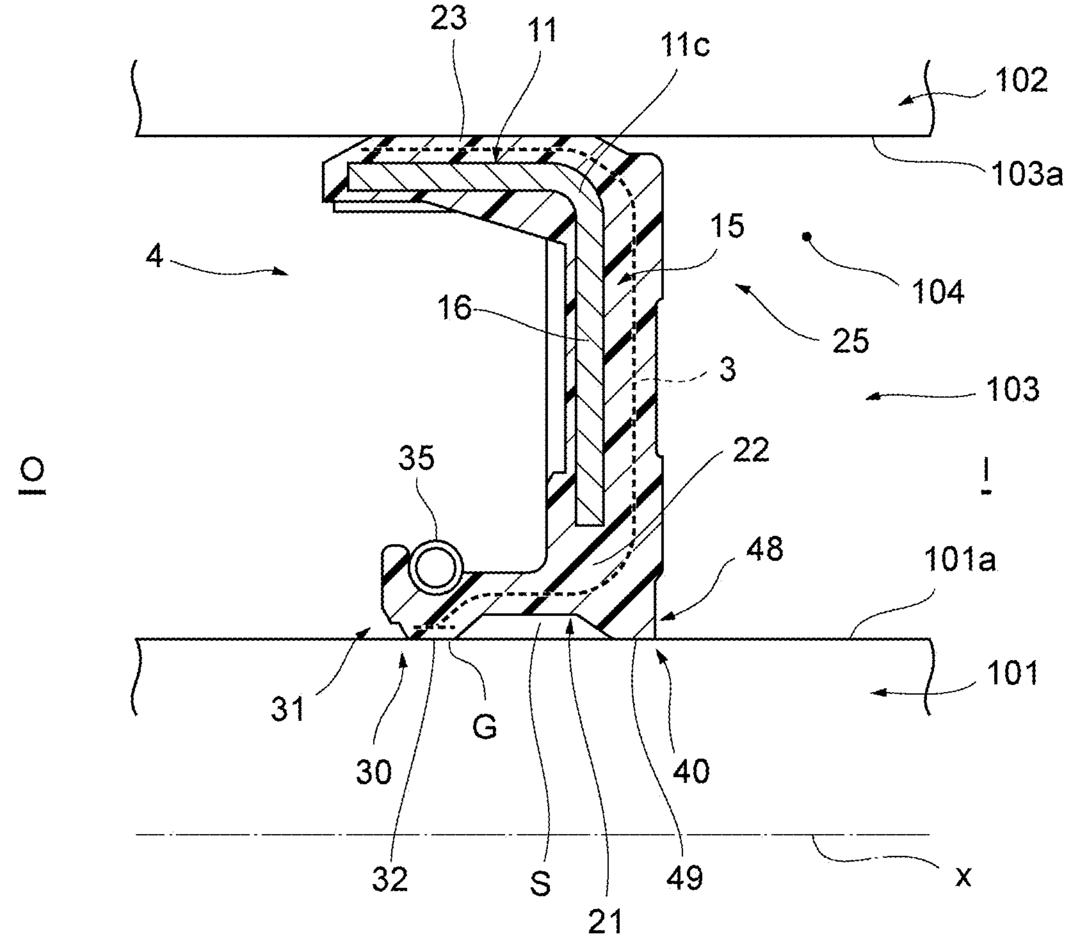
FIG. 8 is a partial cross sectional view of a sealing device according to a second embodiment of the present disclosure disposed in an annular space between an inner peripheral member and an outer peripheral member configured to perform a relative rotation with respect to each other.
Figure 9:
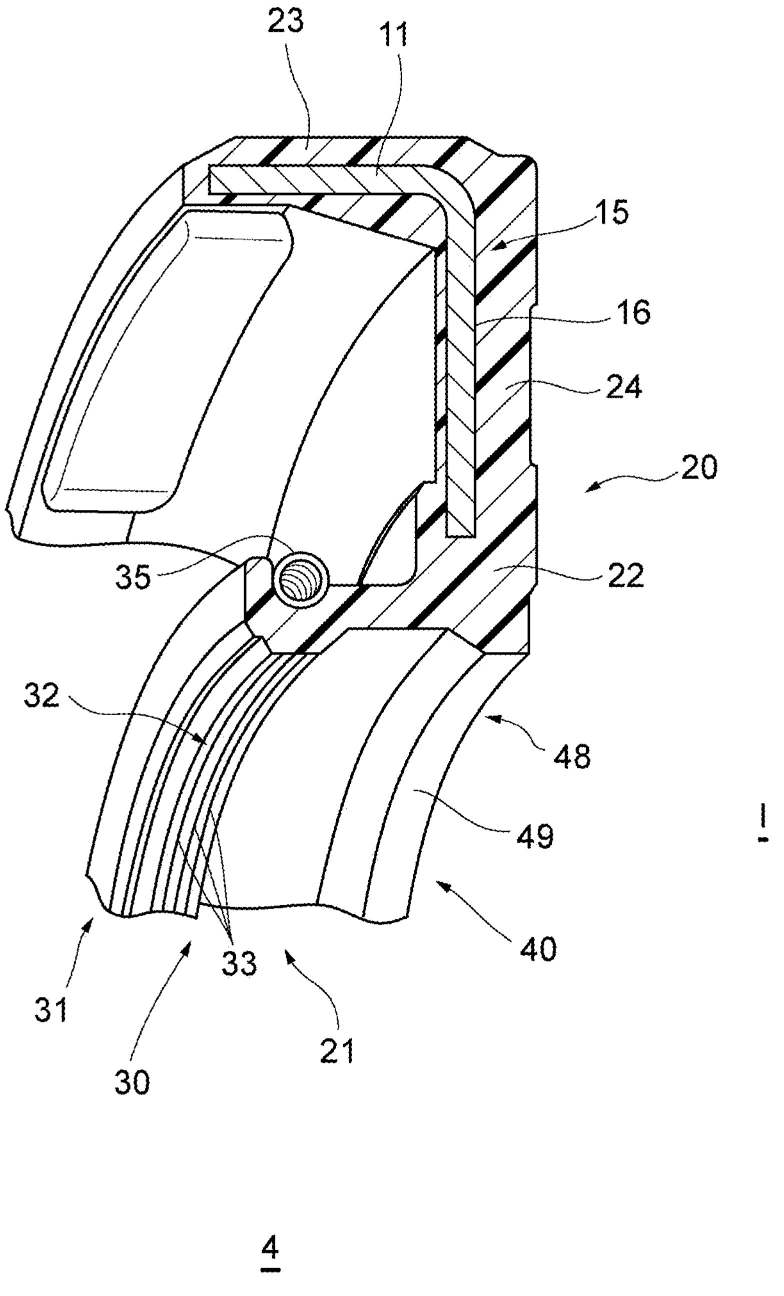
FIG. 9 is a partial perspective view of the sealing device illustrated in FIG. 8.

Next, description will be made on a sealing device 4 according to a second embodiment of the present disclosure. FIG. 8 is a partial cross sectional view of the sealing device 4 according to the second embodiment of the present disclosure disposed in an annular space between an inner peripheral member and an outer peripheral member configured to perform a relative rotation with respect to each other and FIG. 9 is a partial perspective view of the sealing device 4 illustrated in FIG. 8. In the present embodiment, the sealing device 4 is designed for sealing an annular space 104 between a shaft 101, which is a rotary shaft of an electric motor (not illustrated) of a drive device (not illustrated), and a housing 102 of the drive device as illustrated in FIG. 8 as the sealing device 1. It should be noted that an installation object for the sealing device 4 is not limited to such a drive device. Hereinbelow, as for the sealing device 4, a component that has the same configuration as or has a similar function to the above-described sealing device 1 is labelled with the same reference sign in the sealing device and a description thereof is omitted, accordingly.

As illustrated in FIGS. 8 and 9, the sealing device 4 includes a reinforcing ring 15 different in shape from the reinforcing ring 10 of the sealing device 1 and a cross-sectional shape of the reinforcing ring 15 is an L shape. Specifically, the reinforcing ring 15 includes, for example, a tubular portion 11 and a circular ring portion 16, which is a portion in a circular ring shape extending from an end portion 11*c* on the sealed-object side I of the tubular portion 11 toward the inner peripheral side.

The sealing device 4 also includes a seal body 25 different in shape from the seal body 20 of the sealing device 1 in conformity with the shape of the reinforcing ring 15. Specifically, unlike the seal portion 21 of the sealing device 1, a seal portion 21 of the seal body 25 of the sealing device 4 includes no seal lip portion 40 extending from a base portion 22 toward the sealed-object side I as illustrated in, for example, FIGS. 8 and 9. In the seal lip portion 40 of the sealing device 4, a seal lip 48 is formed at an end portion on the inner peripheral side of the base portion 22. Moreover, the seal lip portion 40 of the sealing device 4 includes no garter spring 47.

The seal lip 48 of the sealing device 4 has a planar seal surface 49 formed to be able to come into contact with the shaft 101 as the electrical continuity lip 31. The seal surface 49 is a cylindrical or substantially cylindrical surface centered about or substantially centered about the axis x as illustrated in, for example, FIG. 9. It should be noted that unlike the contact surface 32 of the electrical continuity lip 31, the seal lip 48 is provided with neither the grease grooves 33 nor the communicating grooves 34. Moreover, unlike the seal lip 41 of the sealing device 1, the seal lip 48 is also provided with neither the thread grooves 45 nor the thread protrusions 46. In other words, the seal lip 48 is provided with no fluid returning portion that produces the screw pumping action. Thus, the pressure in the space S created in the sealing device 4 between the electrical continuity lip portion 30 and the seal lip 48 will not become negative and, accordingly, the contact surface 32 of the electrical continuity lip 31 is also provided with no communicating grooves 34. It should be noted that the contact surface 32 of the electrical continuity lip 31 of the sealing device 4 may be provided with the communicating grooves 34.

The sealing device 4 having the above-described configuration works as the sealing device 1 in terms of measures against electromagnetic noise and lubricating function. In other words, the seal portion 21 of the sealing device 4 comes into contact with the shaft 101 at the electrical continuity lip 31 and the seal lip 48, preventing the leakage of the sealed object from the sealed-object side I. At this time, the seal lip 48 fulfills a main sealing function, in which the seal surface 49 prevents the leakage of a fluid from the sealed-object side I. The electrical continuity lip 31 fulfills an auxiliary sealing function, in which the contact surface 32 blocks the fluid accidentally leaking through the seal lip 48. The electrical continuity lip 31 also functions as a dust lip to reduce the entry of foreign substances from the atmosphere side O into the sealed-object side I.

Moreover, in the sealing device 4, the electrically conductive circuit 3 with electrical conductivity formed by the electrically conductive elastic body unit 2 (the seal body 25) also includes the grease G and the seal body 25 and, additionally, the grease G, the reinforcing ring 15, and the seal body 25, causing electromagnetic noise transmitted to the shaft 101 to flow to the housing 102 as in the sealing device 1. This makes it possible to prevent the occurrence of a communication failure or a malfunction of electronic equipment and the occurrence of electrolytic corrosion of a metal part.

In the sealing device 4, the space between the contact surface 32 of the electrical continuity lip 31 and the shaft 101 is also filled with the grease G, so that a coating film of the grease G is interposed between the contact surface 32 and the shaft 101 as in the sealing device 1. This makes it possible to reduce or eliminate a gap breaking the conduction of electricity between the contact surface 32 of the electrical continuity lip 31 and the shaft 101, enabling an enhancement of electrical conductivity between the contact surface 32 of the electrical continuity lip 31 and the shaft 101. The electrically conductive circuit 3 thus makes it possible to increase a flow rate of the electromagnetic noise transmitted to the shaft 101 to the housing 102, enabling a further reduction in the occurrence of failures based on the electromagnetic noise.

In the sealing device 4, the space between the contact surface 32 of the electrical continuity lip 31 and the outer peripheral surface 101*a* of the shaft 101 is also filled with the grease G, so that the coating film of the grease G is interposed between the contact surface 32 and the outer peripheral surface 101*a* of the shaft 101. Thus, even though a gap is created between the contact surface 32 of the electrical continuity lip 31 and the outer peripheral surface 101*a* of the shaft 101 during a high-speed rotation of the shaft 101, the gap is filled with the grease G. An electrically conductive performance between the contact surface 32 of the electrical continuity lip 31 and the shaft 101 is thus maintained even during a high-speed rotation of the shaft 101, enabling the maintenance of the flow rate of the electromagnetic noise transmitted to the shaft 101 to the housing 102.

Accordingly, in the sealing device 4, it is also possible to set the impedance of the electrically conductive circuit 3 in the range from 0.01Ω to 100Ω, inclusive, during a rotation of the shaft 101 of the electric motor at a circumferential velocity of 60 m/s or less as illustrated in FIG. 6. Thus, since the impedance of the electrically conductive circuit 3 is allowed to fall within the range from 0.01Ω to 100Ω, inclusive, even in a case where the shaft 101 of the electric motor rotates at a high speed, it is possible to reduce a decrease in electrical conductivity in the sealing device 4.

Figure 10:
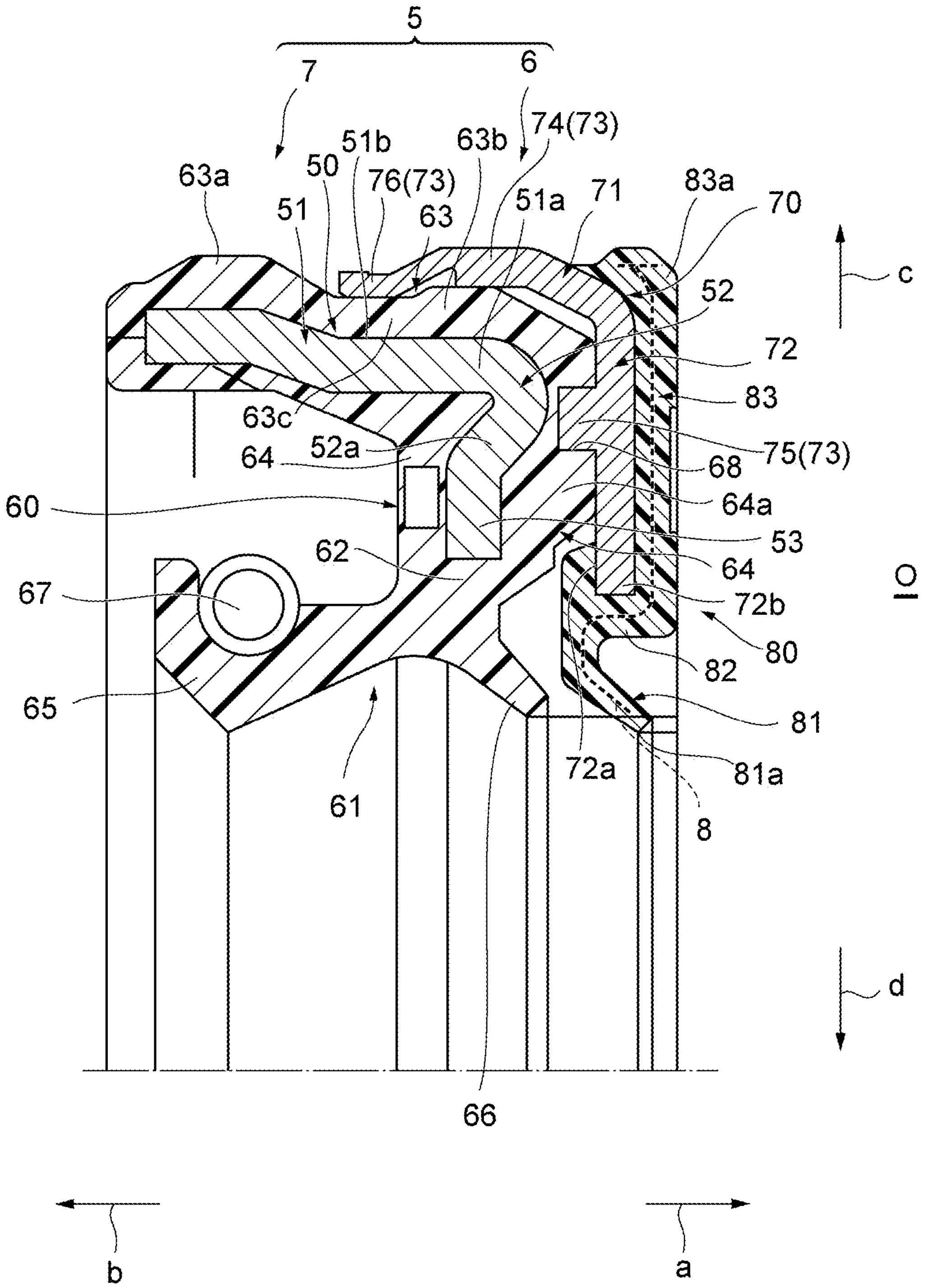
FIG. 10 is a cross sectional view of a cross section along an axis for illustrating a schematic configuration of a sealing device according to a third embodiment of the present disclosure.
Figure 11:
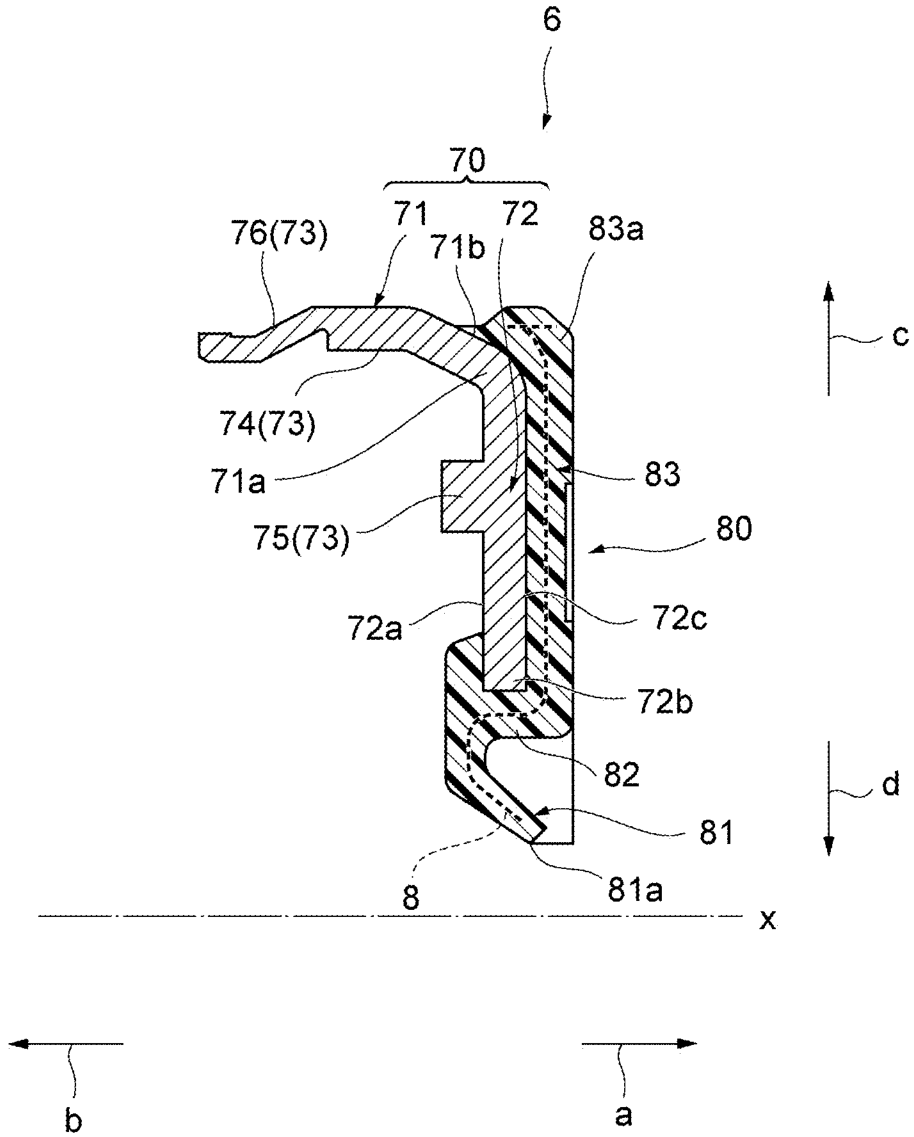
FIG. 11 is a cross sectional view of a cross section along an axis of an electrically conductive elastic body unit of the sealing device illustrated in FIG. 10.
Figure 12:
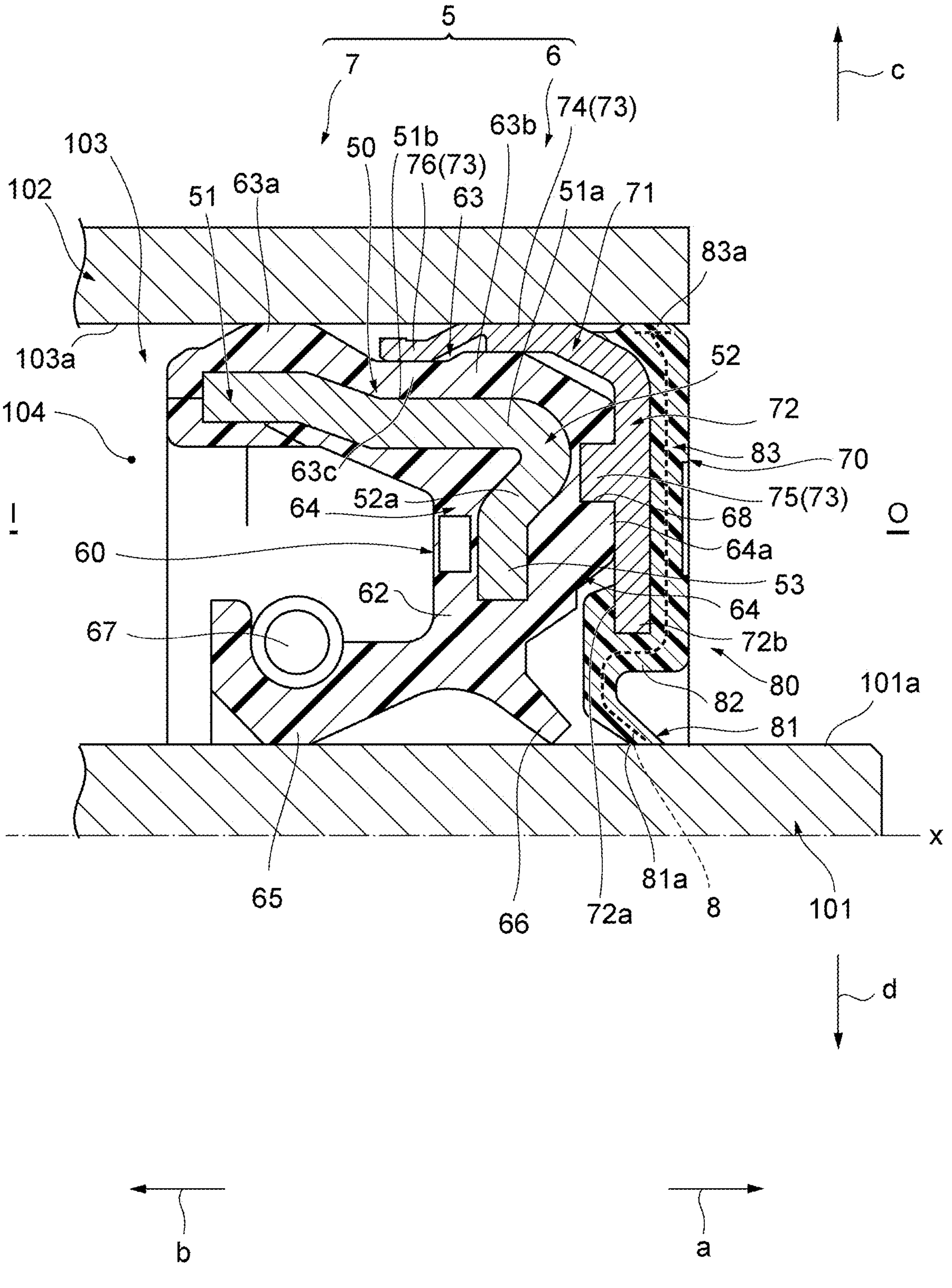
FIG. 12 is a partial cross sectional view of the sealing device illustrated in FIG. 10 disposed in an annular space between an inner peripheral member and an outer peripheral member configured to perform a relative rotation with respect to each other.

Next, description will be made on a sealing device 5 according to a third embodiment of the present disclosure. FIG. 10 is a cross sectional view of a cross section along the axis x for illustrating a schematic configuration of the sealing device 5 according to the third embodiment of the present disclosure and FIG. 11 is a cross sectional view of a cross section along the axis x of an electrically conductive elastic body unit 6 of the sealing device 5. Moreover, FIG. 12 is a partial cross sectional view of the sealing device 5 disposed in an annular space between an inner peripheral member and an outer peripheral member configured to perform a relative rotation with respect to each other. In the present embodiment, the sealing device 5 is designed for sealing an annular space 104 between a shaft 101, which is a rotary shaft of an electric motor (not illustrated) of a drive device (not illustrated), and a housing 102 of the drive device as illustrated in FIG. 12 as the sealing device 1. It should be noted that an installation object for the sealing device 5 is not limited to such a drive device.

It should be noted that a side indicated by an arrow-a direction in the direction of the axis x (one side in the direction of the axis) is the atmosphere side O (an outer side) and a side indicated by an arrow-b direction in the direction of the axis x (the opposite side in the direction of the axis) is the fluid-to-be-sealed side I (an inner side) as illustrated in FIGS. 10, 11, and 12. Moreover, a side in a direction away from the axis x (an arrow-c direction) in a direction perpendicular to the axis x (a radial direction) is the outer peripheral side and a side in a direction to approach the axis x (an arrow-d direction) is the inner peripheral side.

As illustrated in FIGS. 10 to 12, the sealing device 5 includes the electrically conductive elastic body unit 6, which is an annular member around the axis x and made of an elastic material with electrical conductivity. The electrically conductive elastic body unit 6 is able to come into contact with the shaft 101 of the electric motor and the housing 102. Moreover, the electrically conductive elastic body unit 6 is able to form an electrically conductive circuit 8 between the shaft 101 of the electric motor and the housing 102. A specific description will be made below on a configuration of the sealing device 5, in which an impedance of the electrically conductive circuit 8 during a rotation of the shaft 101 of the electric motor at a circumferential velocity of 60 m/s or less is in a range from 0.01Ω to 100Ω, inclusive.

The electrically conductive elastic body unit 6 is configured to tend to maintain an electrical contact with the shaft 101 even when receiving a force to cancel a contact between the electrically conductive elastic body unit 6 and the shaft 101 based on a rotation of the shaft 101 of the electric motor. As described above, in a case where a rotary shaft of an installation object rotates at a high speed, a conventional electrical continuity lip of a so-called radial type made of an elastic material with electrical conductivity receives, from the rotary shaft rotating at a high speed, a force working in such a manner as to cancel a contact between the electrical continuity lip and the rotary shaft. In a case where the rotary shaft rotates at a high speed such as a circumferential velocity of 30 m/s or more, it is speculated that the conventional radial-type electrical continuity lip has a decreased contact area with the rotary shaft as receiving the force to cancel the contact in some cases. Accordingly, in a case where the rotary shaft rotates at a high speed such as a circumferential velocity of 30 m/s or more, it is speculated that the conventional radial-type electrical continuity lip may be decreased in electrical conductivity between the electrical continuity lip and the rotary shaft.

In contrast, the electrically conductive elastic body unit 6 of the sealing device 5 is designed to maintain an electrical contact between the electrically conductive elastic body unit 6 and the shaft 101 even when the shaft 101 rotates at a high speed so that the impedance of the electrically conductive circuit 8 formed by the electrically conductive elastic body unit 6 falls within the range from 0.01Ω to 100Ω, inclusive, even in a case where the shaft 101 of the electric motor rotates at a circumferential velocity of 60 m/s or less. As seen from the above, the sealing device 5 is allowed to have the impedance within the range from 0.01Ω to 100Ω, inclusive, even in a case where the shaft 101 of the electric motor rotates at a high speed, so that it is possible to reduce a decrease in electrical conductivity.

As illustrated in FIG. 10, the sealing device 5 includes a sealing device body unit 7. The sealing device body unit 7 includes a reinforcing ring 50 and a seal body 60, which is a member formed by an elastic body in the form of rubber attached to the reinforcing ring 50. The reinforcing ring 50 includes a tubular portion 51, which is a portion in a tubular shape extending along the axis x, a bent portion 52, which is an annular portion folded from an end portion (an end portion 51*a*) on the atmosphere side O of the tubular portion 51 toward the atmosphere side O, and a circular ring portion 53, which is a portion in a circular ring shape extending from an end portion (an end portion 52*a*) on an inner peripheral side of the bent portion 52 toward the inner peripheral side. The tubular portion 51, the bent portion 52, and the circular ring portion 53 are portions of the reinforcing ring 50 that are integrally formed from the same metal material. The reinforcing ring 50 is, for example, molded by pressing an annular metal plate. As illustrated in, for example, FIGS. 10 and 12, the tubular portion 51 includes a portion in or substantially in a cylindrical shape centered about or substantially centered about the axis x and is shaped in such a manner as to fix the sealing device 5 to the through hole 103 in a use state in which the sealing device 5 is attached to the through hole 103 of the housing 102. It should be noted that the material of the reinforcing ring 50 is not limited to a metal material.

The seal body 60 is made of an elastic material that is lower in electrical conductivity than an elastic material with electrical conductivity, specifically, an elastic material with no electrically conductivity, and this elastic material is cross-bonded to the reinforcing ring 50 to be integrally molded. The seal body 60 is, for example, a molded body obtained by insert molding with use of the reinforcing ring 50 as an insert part. As illustrated in, for example, FIG. 10, the seal body 60 is attached to the reinforcing ring 50 in such a manner as to cover the whole of the reinforcing ring 50 and includes a seal portion 61, a base portion 62, a gasket portion 63, and a cover portion 64. The seal portion 61 also includes a seal lip portion 65 and a dust lip portion 66. It should be noted that the seal portion 61, the base portion 62, the gasket portion 63, and the cover portion 64 are portions of the seal body 60 that are integrally formed from the same material.

The base portion 62 is a portion located at and in the vicinity of an end portion on the inner peripheral side of the circular ring portion 53 of the reinforcing ring 50, the gasket portion 63 is a portion covering an outer peripheral surface 51*b* of the tubular portion 51 of the reinforcing ring 50, and the cover portion 64 is a portion covering the reinforcing ring 50 between the base portion 62 and the gasket portion 63. The gasket portion 63 has a portion (a contact portion 63*a*) having an outer diameter that is the same as or larger than an inner diameter of an inner peripheral surface 103*a* of the through hole 103 of the housing 102. Thus, in a case where the sealing device 5 is attached to the space 104 of the housing 102, the contact portion 63*a* of the gasket portion 63 is compressed in the radial direction between the tubular portion 51 of the reinforcing ring 50 and the housing 102, fixing the sealing device 5 to the housing 102 with sealing between the inner peripheral surface 103*a* of the through hole 103 of the housing 102 and the sealing device 5.

In the seal portion 61, the seal lip portion 65 and the dust lip portion 66 extend opposite each other along the axis x from the base portion 62 as illustrated in FIGS. 10 and 12. The seal lip portion 65 extends, for example, from an end on the sealed-object side I of the base portion 62 toward the sealed-object side I in such a manner as to be able to come into contact with the outer peripheral surface 101*a* of the shaft 101. The dust lip portion 66 extends, for example, from an end on the atmosphere side O of the base portion 62 toward the atmosphere side O and the inner peripheral side in such a manner as to be able to come into contact with an outer peripheral surface 101*a* of the shaft 101. The seal lip portion 65 is configured to prevent the leakage of the sealed object and the dust lip portion 66 is configured to prevent the entry of foreign substances such as rainwater, mud, and dust from the atmosphere side O into the sealed-object side I. Moreover, the seal lip portion 65 is attached with a garter spring 67 that increases a tension force to press the seal lip portion 65 against the outer peripheral surface 101*a* of the shaft 101.

The electrically conductive elastic body unit 6 includes a reinforcing ring 70 and a main body portion 80, which is a member attached to the reinforcing ring 70, as illustrated in FIG. 10 and FIG. 11. The main body portion 80 is a member made of an elastic material with electrical conductivity in the form of rubber. The elastic material with electrical conductivity of the main body portion 80 is, for example, an electrically conductive rubber. Moreover, the elastic material with electrical conductivity forming the main body portion 80 is, for example, a material with a heat resistance in a range from minus 40 degrees to 200 degrees, inclusive, and, for example, an electrically conductive fluorocarbon rubber (FKM). In the main body portion 80, the elastic material with electrical conductivity is cross-bonded to the reinforcing ring 70 to be integrally molded. The main body portion 80 is, for example, a molded body obtained by insert molding with use of the reinforcing ring 70 as an insert part.

As illustrated in, for example, FIGS. 10 and 11, the reinforcing ring 70 includes a tubular portion 71, which is a portion in a tubular shape extending along the axis x, and a circular ring portion 72, which is a portion in a circular ring shape extending from an end portion (an end portion 71*a*) on the atmosphere side O of the tubular portion 71 toward the inner peripheral side. The tubular portion 71 and the circular ring portion 72 are portions of the reinforcing ring 70 that are integrally formed from the same metal material. The reinforcing ring 70 is, for example, molded by pressing an annular metal plate. As illustrated in, for example, FIGS. 10 and 11, the tubular portion 71 includes a portion in or substantially in a cylindrical shape centered about or substantially centered about the axis x and is shaped in such a manner as to fix the electrically conductive elastic body unit 6 between the sealing device body unit 7 and the through hole 103 in a use state in which the sealing device 5 is attached to the through hole 103 of the housing 102. It should be noted that the material of the reinforcing ring 70 is not limited to a metal material.

Specifically, the tubular portion 71 is located, within the sealing device 5, on the outer peripheral side of the tubular portion 51 of the reinforcing ring 50 of the sealing device body unit 7 and has a shape to sandwich and compress the gasket portion 63 of the seal body 60 between the tubular portion 71 and the tubular portion 51 of the reinforcing ring 50 as illustrated in FIGS. 10 and 12. The circular ring portion 72 has a shape to come into contact with the cover portion 64 on the atmosphere side O of the seal body 60 of the sealing device body unit 7 from the atmosphere side O in a state (an assembled state) in which the electrically conductive elastic body unit 6 is assembled with sealing device body unit 7 as illustrated in FIGS. 10 and 12. Moreover, the circular ring portion 72 extends more toward inner peripheral side than the circular ring portion 53 of the reinforcing ring 50 of the sealing device body unit 7 as illustrated in, for example, FIGS. 10 and 12.

Moreover, the reinforcing ring 70 includes, at a portion on the atmosphere side O of the sealing device 5, a sealing device joining portion 73 formed so as to allow the electrically conductive elastic body unit 6 to be joined to the sealing device body unit 7. The sealing device joining portion 73 includes, for example, a tubular portion joining portion 74 and an circular ring portion joining portion 75.

The tubular portion joining portion 74 is formed in a manner such that it is able to be joined to, for example, a part of the gasket portion 63 of the seal body 60 of the sealing device body unit 7. Specifically, for example, the tubular portion joining portion 74 has a shape in which in a state in which the electrically conductive elastic body unit 6 is assembled with the sealing device body unit 7, the tubular portion joining portion 74 is able to be joined to the sealing device body unit 7 with a tubular portion joined portion **63*b*, which is a portion formed at a portion on the atmosphere side O with respect to the contact portion 63*a* of the gasket portion 63, being compressed between the tubular portion joining portion 74 and tubular portion 51 of the reinforcing ring 50 as illustrated in FIGS. 10 and 12. The tubular portion joined portion 63*b*, for example, projects more toward the outer peripheral side than a portion (an engaged portion 63*c*) between the contact portion 63*a* and the tubular portion joined portion 63*b* of the gasket portion 63 and does not project more toward the outer peripheral side than the contact portion 63*a* as illustrated in FIGS. 10 and 12**.

Moreover, for example, the tubular portion joining portion 74 is formed with a tubular portion engaging portion 76, which is to be engaged with the gasket portion 63 at the engaged portion **63*c* of the gasket portion 63. In the assembled state, the tubular portion engaging portion 76 is in contact with or faces the engaged portion 63*c* of the gasket portion 63 from the outer peripheral side and is engaged with the tubular portion joined portion 63*b*** in the direction of the axis x.

The circular ring portion joining portion 75 is formed to be able to be joined to, for example, a portion (an atmosphere-side cover portion **64*a*) on the atmosphere side O of the cover portion 64 of the seal body 60 of the sealing device body unit 7. Specifically, for example, the circular ring portion joining portion 75 has a shape that allows for joining to a circular ring portion joined portion 68, which is formed in the atmosphere-side cover portion 64*a*, as illustrated in FIGS. 10 to 12. Specifically, for example, the circular ring portion joining portion 75 is a portion projecting toward the sealed-object side I from a surface (a surface 72*a*) of the circular ring portion 72 of the reinforcing ring 70 facing the sealed-object side I as illustrated in FIGS. 10 to 12. Specifically, for example, the circular ring portion joined portion 68 is a portion formed in the atmosphere-side cover portion 64*a* and is recessed toward the sealed-object side I in such a manner as to be able to house the circular ring portion joining portion 75 and engageable with the circular ring portion joining portion 75 as illustrated in FIGS. 10 and 12. The circular ring portion joining portion 75 is housed in the circular ring portion joined portion 68 and engaged with the circular ring portion joined portion 68**.

As illustrated in FIG. 11, the main body portion 80 includes an electrical continuity lip 81, a base portion 82, and a coupling portion 83. The electrical continuity lip 81, the base portion 82, and the coupling portion 83 are individual portions of the main body portion 80 made of the same material. The base portion 82 is a portion attached to an end portion (an end portion **72*b*) and the vicinity thereof on the inner peripheral side of the circular ring portion 72 of the reinforcing ring 70 and the electrical continuity lip 81 extends from the base portion 82** toward the inner peripheral side.

The electrical continuity lip 81 is formed in a manner such that in the sealing device 5 attached between the through hole 103 of the housing 102 and the shaft 101 of the drive device, the electrical continuity lip 81 comes into contact with the outer peripheral surface **101*a* of the shaft 101 as illustrated in FIG. 12. The electrical continuity lip 81 has a form in which the electrical continuity lip 81 is increased in rigidity against an external force as approaching the outer peripheral side in the radial direction. As illustrated in, for example, FIG. 12, the electrical continuity lip 81 is formed in a manner such that it is located between the end portion 72*b* of the circular ring portion 72 of the reinforcing ring 70 or the base portion 82 and the outer peripheral surface 101*a* of the shaft 101 in the radial direction and is shaped in a manner such that it is increased in rigidity against an external force directed to the outer peripheral side in the radial direction. Moreover, as illustrated in, for example, FIGS. 10 and 11, when in a free state of not being attached to the drive device, the electrical continuity lip 81 extends from the base portion 82 toward the atmosphere side O (the arrow-a direction side) and the inner peripheral side (the arrow-d direction side) and a portion (a distal edge portion 81*a*) at a distal edge of the electrical continuity lip 81 extends in such a manner as to be opposed to the end portion 72*b* of the circular ring portion 72 of the reinforcing ring 70 or the base portion 82. It should be noted that the electrical continuity lip 81 may be provided with unevenness on a contact surface with the outer peripheral surface 101*a* of the shaft 101**.

The coupling portion 83 is a portion formed in a manner such that in the sealing device 5 attached between the through hole 103 of the housing 102 and the shaft 101 of the drive device, the electrical continuity lip 81 is coupled to the housing 102 with the base portion 82 in between. As illustrated in, for example, FIG. 11, the coupling portion 83 extends over a surface (a surface **72*c*) facing the atmosphere side O of the circular ring portion 72 of the reinforcing ring 70 and a part on the atmosphere side O of a surface (a surface 71*b*) facing the outer peripheral side of the tubular portion 71 of the reinforcing ring 70. Moreover, the coupling portion 83 is able to come into contact with the inner peripheral surface 103*a* of the through hole 103 of the housing 102 at an end portion (an end portion 83*a*) on the outer peripheral side. As illustrated in, for example, FIG. 11, the end portion 83***a* projects more toward the outer peripheral side than the tubular portion 71 of the reinforcing ring 70 or projects toward the outer peripheral side to the same position in the radial direction as the tubular portion 71 of the reinforcing ring 70.

As described above, the main body portion 80, which is made of an elastic material with electrical conductivity, comes into contact with the outer peripheral surface 101*a* of the shaft 101 at the electrical continuity lip 81 while coming into contact with the through hole 103 of the housing 102 at the end portion 83*a* of the coupling portion 83, so that the electrically conductive circuit 8 is formed between the shaft 101 and the housing 102 by the electrically conductive elastic body unit 6.

Next, description will be made on the workings of the sealing device 5 having the above-described configuration. In the sealing device 5 in the use state, which is attached between the through hole 103 of the housing 102 and the shaft 101 of the drive device, the seal lip portion 65 is in contact with the outer peripheral surface 101*a* of the shaft 101, sealing the sealed object within the sealed-object side I to prevent the leakage of the sealed object from the sealed-object side I. Moreover, in the use state of the sealing device 5, the dust lip portion 66 is in contact with the outer peripheral surface 101*a* of the shaft 101 to prevent the entry of foreign substances such as rainwater, mud, and dust from the atmosphere side O into the sealed-object side I.

As described above, there are cases where a vehicle equipped with an electric motor, such as an electric vehicle (EV), suffers the generation of electromagnetic noise due to an induced current generated by the motor, or the like. Moreover, there are cases where electromagnetic noise occurs due to an on/off operation of an inverter for a control of an electric current to be supplied to motorized equipment such as an electric motor or an induced voltage or the like of the motorized equipment itself. In the sealing device 5, the main body portion 80, which is molded from an elastic material with electrical conductivity, of the electrically conductive elastic body unit 6 forms the electrically conductive circuit 8 to cause the electromagnetic noise transmitted to the shaft 101 to flow to the housing 102. This makes it possible to prevent the occurrence of a communication failure or a malfunction of electronic equipment and the occurrence of electrolytic corrosion of a metal part.

In a case where the shaft 101 rotates at a high speed, the electrical continuity lip 81 receives a force acting in a direction to cancel the contact between the electrical continuity lip 81 and the shaft 101 based on the rotation of the shaft 101. However, the electrical continuity lip 81 has a shape to increase a rigidity against an external force directed to the outer peripheral side in the radial direction as described above. Thus, in a case where the shaft 101 rotates at a high speed, for example, in a case where the shaft 101 rotates at a high speed equal to or more than a circumferential velocity of 30 m/s, a force acting in a direction to create a gap between the distal edge portion 81*a* of the electrical continuity lip 81 and the outer peripheral surface 101*a* of the shaft 101 may be generated but the electrical continuity lip 81 has a high rigidity against an external force directed to the outer peripheral side in the radial direction in the sealing device 5. This prevents a gap breaking the conduction of electricity from being created between the contact surface (the distal edge portion 81*a*) of the electrical continuity lip 81 and the outer peripheral surface 101*a* of the shaft 101 during a high-speed rotation of the shaft 101. As seen from the above, an electrically conductive performance between the distal edge portion 81*a* of the electrical continuity lip 81 and the shaft 101 is maintained even during a high-speed rotation of the shaft 101, enabling the maintenance of the flow rate of the electromagnetic noise transmitted to the shaft 101 to the housing 102.

Accordingly, in the sealing device 5, the impedance of the electrically conductive circuit 8 in the range from 0.01Ω to 100Ω, inclusive, is possible during a rotation of the shaft 101 of the electric motor at a circumferential velocity of 60 m/s or less as illustrated in FIG. 6. Thus, since the impedance of the electrically conductive circuit 8 is allowed to fall within the range from 0.01Ω to 100Ω, inclusive, even in a case where the shaft 101 of the electric motor rotates at a high speed, it is possible to reduce a decrease in electrical conductivity in the sealing device 5. It should be noted that the impedance of the electrically conductive circuit 8 of the sealing device 5 is also measurable as that of the sealing device 1 and, for example, measurable by the impedance measurement device 200 as illustrated in FIG. 7.

Moreover, in installing the sealing device 5 in the annular space 104 between the shaft 101 and the housing 102, the sealing device 5 is installable with the electrically conductive elastic body unit 6 and the sealing device body unit 7 assembled. Since the main body portion 80 of the electrically conductive elastic body unit 6 including the electrical continuity lip 81 is a molded body made of an elastic material with electrical conductivity, a deformation of the main body portion 80 is reduced as compared with that of a conventional electrically conductive sliding member made of an electrically conductive brush or fiber. This makes the electrically conductive elastic body unit 6 easily attachable to the sealing device body unit 7 and easily attachable to the annular space 104 between the shaft 101 and the housing 102. Moreover, the electrically conductive elastic body unit 6, which includes the tubular portion joining portion 74 and the circular ring portion joining portion 75, is allowed to be easily attached and positioned to the sealing device body unit 7.

As described above, the sealing device 5 according to the third embodiment of the present disclosure is capable of maintaining an electrically conductive performance relative to even the shaft 101 rotating at a high speed.

Next, description will be made on a sealing device 5A according to a fourth embodiment of the present disclosure. Hereinbelow, components having the same functions as or similar functions to those of the electrically conductive elastic body unit 6 and the sealing device body unit 7 of the sealing device 5 according to the above-described third embodiment are labelled with the same reference signs and the description thereof is omitted, accordingly, and a different component will be described.

Figure 13:
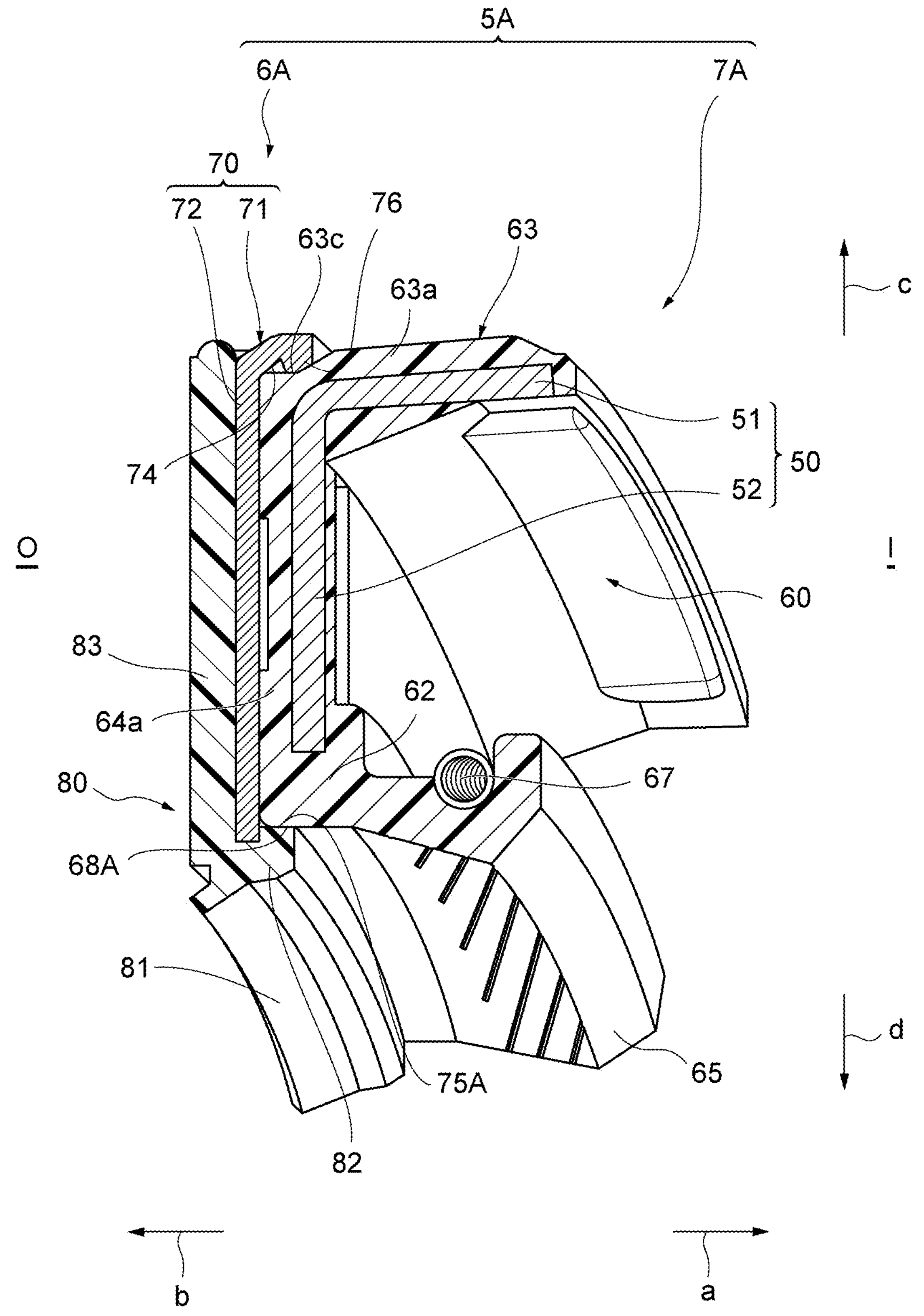
FIG. 13 is a partial perspective view of a sealing device according to a fourth embodiment of the present disclosure.

FIG. 13 is a partial perspective view of the sealing device 5A according to the fourth embodiment of the present disclosure. The sealing device 5A includes an electrically conductive elastic body unit 6A and a sealing device body unit 7A. As illustrated in FIG. 13, the sealing device 5A is different from the above-described sealing device 5 mainly in the configuration of the circular ring portion joining portion and the configuration of the circular ring portion joined portion. Specifically, a circular ring portion joint portion 75A of the electrically conductive elastic body unit 6A is, within the electrically conductive elastic body unit 6A, offset toward the inner peripheral side. Specifically, for example, the circular ring portion joining portion 75A is formed in the base portion 82 of the main body portion 80 at a position opposed to the tubular portion joining portion 74 or the tubular portion engaging portion 76 and projects toward the outer peripheral side from a portion on the outer peripheral side of the end portion on the sealed-object side I of the base portion 82 as illustrated in FIG. 13. The sealing device body unit 7A is in a form able to be joined to the circular ring portion joining portion 75A of the main body portion 80. Specifically, for example, the base portion 62 of the seal body 60 of the sealing device body unit 7A has a shape to be pressed against the circular ring portion joining portion 75A of the main body portion 80 toward an inner-peripheral-side direction (the arrow-d direction) in a state in which the electrically conductive elastic body unit 6A and the sealing device body unit 7A are assembled as illustrated in FIG. 13. In other words, the base portion 62 of the seal body 60 of the sealing device body unit 7A is provided with a circular ring portion joined portion 68A formed in a manner such that it is pressed against the circular ring portion joining portion 75A of the main body portion 80 toward the inner peripheral direction (the arrow-d direction) in the state in which the electrically conductive elastic body unit 6A and the sealing device body unit 7A are assembled. Moreover, the seal body 60 of the sealing device body unit 7A is provided with no dust lip.

In the sealing device 5A according to the fourth embodiment of the present disclosure, the electrically conductive elastic body unit 6A and the sealing device body unit 7A are configured to be assembled with each other with the base portion 62 and the atmosphere-side cover portion 64*a* of the seal body 60 of the sealing device body unit 7A being received and engaged between the tubular portion joining portion 74 and the tubular portion engaging portion 76 of the electrically conductive elastic body unit 6A and the circular ring portion joining portion 75A of the electrically conductive elastic body unit 6A as illustrated in FIG. 13. The sealing device 5A according to the fourth embodiment of the present disclosure is also able to work as the above-described sealing device 5 to produce a similar effect.

Next, description will be made on a sealing device 5B according to a fifth embodiment of the present disclosure. Hereinbelow, components having the same functions as or similar functions to those of the electrically conductive elastic body units 6, 6A and the sealing device body units 7, 7A of the sealing devices 5, 5A according to the above-described third and fourth embodiments are labelled with the same reference signs and the description thereof is omitted, accordingly, and a different component will be described.

Figure 14:
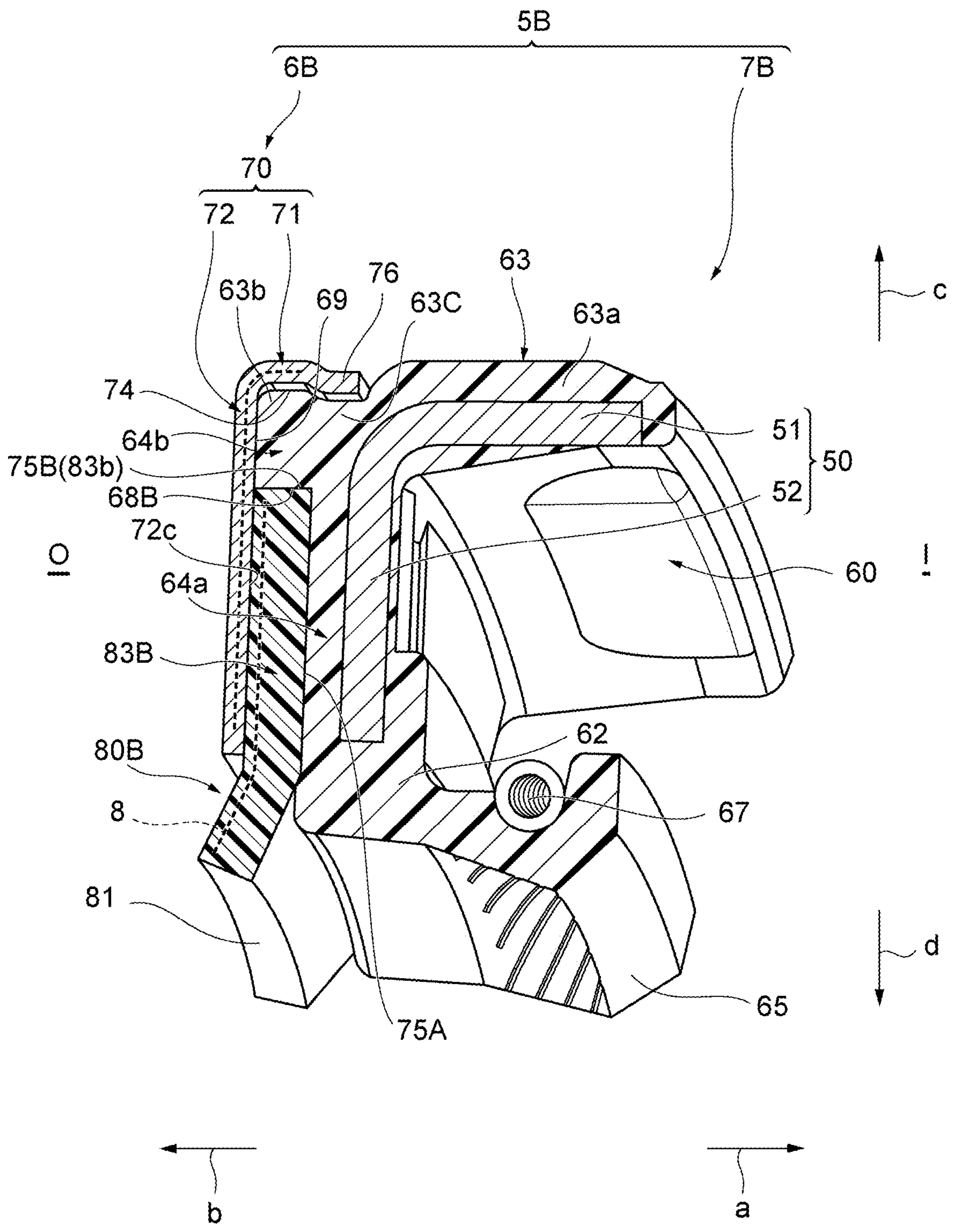
FIG. 14 is a partial perspective view of a sealing device according to a fifth embodiment of the present disclosure.

FIG. 14 is a partial perspective view of the sealing device 5B according to the fifth embodiment of the present disclosure. The sealing device 5B includes an electrically conductive elastic body unit 6B and a sealing device body unit 7B. As illustrated in FIG. 14, the sealing device 5B is different from the above-described sealing devices 5, 5A mainly in the main body portion of the electrically conductive elastic body unit, the configuration of the circular ring portion joining portion, and the configuration of the circular ring portion joined portion. As illustrated in, for example, FIG. 14, a main body portion 80B of the electrically conductive elastic body unit 6B is attached to the surface 72*c*, which faces the sealed-object side I, of the reinforcing ring 70. Specifically, for example, a coupling portion 83B of the main body portion 80B is attached to a portion on the inner peripheral side of the surface 72*c* of the reinforcing ring 70 with an annular space (a space 69) being formed between an end on the outer peripheral side of the coupling portion 83B and the tubular portion 71 of the reinforcing ring 70 as illustrated in FIG. 14. Moreover, the main body portion 80B is provided with no base portion and an electrical continuity lip 81 extends from an end on the inner peripheral side of the coupling portion 83B as illustrated in FIG. 14.

Moreover, the atmosphere-side cover portion 64*a* of the sealing device body unit 7B is, on inner peripheral side, formed with an annular recessed portion formed to be able to house the coupling portion 83B of the main body portion 80B, and a lower portion of the tubular portion joined portion 63*b* of the gasket portion 63 projects toward the atmosphere side O with a projecting portion 64*b*, which is an annular projecting portion, being formed at a portion between the gasket portion 63 and the atmosphere-side cover portion 64*a* as illustrated in FIG. 14. The projection portion 64*b* is in a shape able to be housed in the annular space 69 between an end (an end 83*b*) on the outer peripheral side of the coupling portion 83B of the electrically conductive elastic body unit 6B and the tubular portion 71 of the reinforcing ring 70 in the state in which the electrically conductive elastic body unit 6B and the sealing device body unit 7B are assembled as illustrated in FIG. 14. Moreover, the seal body 60 of the sealing device body unit 7B is provided with no dust lip.

Moreover, specifically, a circular ring portion joining portion 75B is formed by the end 83*b* facing the outer peripheral side of the coupling portion 83B of the main body portion 80B of the electrically conductive elastic body unit 6B and a circular ring portion joined portion 68B is formed by an annular surface facing the inner peripheral side of the annular projecting portion 64*b* of the seal body 60 of the sealing device body unit 7B as illustrated in FIG. 14. In other words, in the state in which the electrically conductive elastic body unit 6B and the sealing device body unit 7B are assembled, the projecting portion 64*b* is configured to be housed in the space 69 with a surface on the inner peripheral side (the circular ring portion joined portion 68B) of the projecting portion 64*b* being compressed in the radial direction between the end 83*b* (the circular ring portion joining portion 75B) facing the outer peripheral side of the coupling portion 83B of the main body portion 80B and the tubular portion 71 of the reinforcing ring 70 of the electrically conductive elastic body unit 6B. As seen from the above the circular ring portion joining portion 75B is in a form able to be joined to the circular ring portion joined portion 68B.

In the sealing device 5B according to the fifth embodiment of the present disclosure, the electrically conductive elastic body unit 6B and the sealing device body unit 7B are configured to be assembled with each other with the projecting portion 64*b* of the seal body 60 of the sealing device body unit 7B being housed and engaged in a space (the space 69) between the tubular portion joining portion 74 and the tubular portion engaging portion 76 of the electrically conductive elastic body unit 6B and the circular ring portion joining portion 75B of the electrically conductive elastic body unit 6B as illustrated in FIG. 14. The sealing device 5B according to the fifth embodiment of the present disclosure is also able to work as the above-described sealing device 5 to produce a similar effect.

It should be noted that in the sealing device 5B, the material of the reinforcing ring 70 of the electrically conductive elastic body unit 6B is a metal material and the tubular portion 71 of the reinforcing ring 70 is configured to be in contact with the inner peripheral surface 103*a* of the through hole 103 of the housing 102 in the use state, so that the electrically conductive circuit 8 is formed by the main body portion 80B and the metal reinforcing ring 70 as illustrated in FIG. 14.

The embodiments of the present disclosure are described hereinabove. However, the present disclosure is not limited to the sealing devices 1, 4, 5, 5A, and 5B according to the above-described embodiments of the present disclosure and includes any form within the scope of the conception and claims of the present disclosure. Moreover, in order to achieve at least a part of the above-described problems and effects, the individual components may be selectively combined, if necessary. For example, the shapes, materials, locations, sizes, and the like of the individual components in the above-described embodiments may be changed in accordance with a specific mode of use of the present disclosure, if necessary.

The invention claimed is:

1. A sealing device for sealing an annular space between an inner peripheral member and an outer peripheral member configured to perform a relative rotation with respect to each other, the sealing device comprising:

an electrically conductive elastic body unit that is an annular member around an axis, the electrically conductive elastic body unit including a portion made of an elastic material with electrical conductivity, wherein the electrically conductive elastic body unit includes an annular electrical continuity lip that is annular and extends around the axis, the electrical continuity lip having a cylindrical contact surface, in a free state, that is configured to come into contact with the inner peripheral member and another contact surface that is configured to contact the outer peripheral member, thereby forming an electrically conductive circuit between the inner peripheral member and the outer peripheral member, the cylindrical contact surface having annular grooves that are spaced apart from each other in a direction of the axis and communicating grooves that extend in the direction of the axis, wherein the communicating grooves are spaced apart from each other around the axis;

a seal lip portion that includes a seal lip having thread grooves that are inclined with respect to the direction of the axis;

an inner space that is empty and defined between the seal lip and the electrical continuity lip, wherein the thread grooves face the inner space, wherein each of the communicating grooves intersect the annular grooves to communicate the inner space with an exterior space that is outside of the electrical continuity lip;

an electrically conductive lubricant provided within the annular grooves; and wherein an impedance of the electrically conductive circuit during the relative rotation at a circumferential velocity of 60 m/s or less is in a range from 0.01Ω to 100Ω.

2. The sealing device according to claim 1, wherein the electrically conductive circuit is configured to tend to maintain an electrical contact with the inner peripheral member even though receiving a force to cancel a contact between the electrically conductive elastic body unit and the inner peripheral member based on the relative rotation.

3. The sealing device according to claim 1, wherein the electrically conductive elastic body unit has a heat resistance in a range from minus 40 degrees to 200 degrees.

* * * * *